(12) United States Patent
Nakamura

(10) Patent No.: US 7,806,050 B2
(45) Date of Patent: Oct. 5, 2010

(54) INK COMPOSITION, INKJET RECORDING METHOD, METHOD OF PRODUCING PLANOGRAPHIC PRINTING PLATE, AND PLANOGRAPHIC PRINTING PLATE

(75) Inventor: Ippei Nakamura, Shizuoka-ken (JP)

(73) Assignee: FUJIFILM Corporation, Tokyo (JP)

( * ) Notice: Subject to any disclaimer, the term of this patent is extended or adjusted under 35 U.S.C. 154(b) by 643 days.

(21) Appl. No.: 11/702,187

(22) Filed: Feb. 5, 2007

(65) Prior Publication Data
US 2007/0182786 A1   Aug. 9, 2007

(30) Foreign Application Priority Data

| Feb. 6, 2006 | (JP) | .............................. 2006-028998 |
| Feb. 10, 2006 | (JP) | .............................. 2006-034138 |

(51) Int. Cl.
   C09D 11/00    (2006.01)
   B05D 1/32     (2006.01)
(52) U.S. Cl. .................. 101/130; 427/466; 522/33; 522/64; 522/71; 522/75; 522/83; 522/114; 522/121; 522/167
(58) Field of Classification Search .............. 522/63, 522/71, 113, 126, 129, 130, 135, 136, 139, 522/167, 173, 174, 909, 116, 8, 9, 16, 18, 522/75, 83, 114, 121, 33, 64; 430/270.1, 430/302; 101/130, 463.1; 427/466
See application file for complete search history.

(56) References Cited

U.S. PATENT DOCUMENTS

| 5,609,993 | A | * | 3/1997 | Hase et al. .................. 430/302 |
| 2003/0199612 | A1 | | 10/2003 | Nakajima |
| 2004/0099170 | A1 | | 5/2004 | Takabayashi |
| 2006/0046187 | A1 | * | 3/2006 | Kuroki et al. ............ 430/270.1 |
| 2006/0210918 | A1 | * | 9/2006 | Kuroki ..................... 430/270.1 |
| 2008/0090929 | A1 | * | 4/2008 | Wilson et al. ................. 522/75 |

FOREIGN PATENT DOCUMENTS

| EP | 0 984 045 A1 | 3/2000 |
| EP | 1 331 251 A1 | 7/2003 |
| EP | 1 469 049 A1 | 10/2004 |
| EP | 1 502 935 A1 | 2/2005 |
| EP | 1 630 608 A2 | 3/2006 |
| EP | 1 688 468 A1 | 8/2006 |
| EP | 1 703 325 A1 | 9/2006 |
| JP | 61-174276 A | 8/1986 |
| JP | 5-214280 A | 8/1993 |
| JP | 2006-064920 * | 8/2004 |
| JP | 2006-256132 * | 3/2005 |
| WO | WO 99/07796 | 2/1999 |
| WO | WO 2004/037799 A1 | 5/2004 |
| WO | WO 2004/046260 A2 | 6/2004 |
| WO | 2005/030881 A | 4/2005 |
| WO | WO-2007/057333 A1 * | 11/2006 |

* cited by examiner

*Primary Examiner*—Susan W Berman
(74) *Attorney, Agent, or Firm*—Sughrue Mion, PLLC

(57) ABSTRACT

The invention provides an ink composition which includes a polymerization initiator, a polymerizable compound, a colorant, and a high molecular compound having a repeating unit represented by the following formula (I). In formula (I), n represents an integer of from 1 to 5.

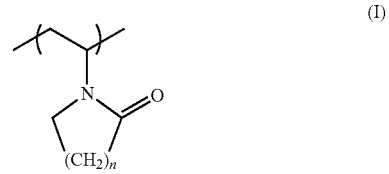

(I)

12 Claims, No Drawings

INK COMPOSITION, INKJET RECORDING METHOD, METHOD OF PRODUCING PLANOGRAPHIC PRINTING PLATE, AND PLANOGRAPHIC PRINTING PLATE

CROSS-REFERENCE TO RELATED APPLICATION

This application claims priority under 35USC 119 from Japanese Patent Application Nos. 2006-28998, and 2006-34138, the disclosures of which are incorporated by reference herein.

BACKGROUND OF THE INVENTION

1. Field of the Invention

The present invention relates to an ink composition suitably used for inkjet recording, an inkjet recoding method, and a planographic printing plate obtained with the ink, and a producing method of the planographic printing plate. In more detail, the invention relates to an ink composition suitable for inkjet recording, which can be cured with high sensitivity to irradiation of active radiation and has sufficient flexibility of a cured material even after the ink is cured, an inkjet recoding method, a planographic printing plate obtained with the ink, and a producing method of the planographic printing plate.

2. Description of the Related Art

As an image recording method that forms, based on an image signal, an image on a recording medium such as paper, an electrophotographic method, sublimation and fusion type thermal transfer methods and an inkjet method can be cited. In the electrophotographic method, since a process of charging and exposing to form an electrostatic latent image on a photoreceptor drum is necessary, a system therefor becomes complicated, resulting in a problem of higher production cost. As for the thermal transfer method, although a device is therefor cheap, since an ink ribbon is used, there are problems in that the running cost is high and waste is generated.

On the other hand, in the inkjet method, a cheap device can be used and the ink is discharged only on a necessary image portion to directly form an image on a recording medium. Accordingly, the ink can be used efficiently and the running cost is less expensive. Furthermore, the inkjet recording method, being lower in noise, is excellent as an image recording method.

As an ink composition that can be cured by irradiation of active radiation such as UV rays (radiation-curable ink composition) such as an inkjet recording ink composition, for instance, an ink composition in which a plurality of monomers having different degrees of functionality are combined and used is proposed (see, Japanese Patent Application Laid-Open (JP-A) No. 5-214280). However, in order to maintain the curing speed in such an ink composition, a polyfunctional monomer has to be used in a large amount, and in such a case, there is a problem with respect to the flexibility of an image after the ink is cured.

Furthermore, conventionally, when a planographic printing plate is prepared, a so-called PS plate that has a constitution in which a lipophilic photosensitive resin layer is disposed on a hydrophilic support is used, the photosensitive resin layer is imagewise exposed to increase or lower the solubility of an exposed portion to an alkali developer to form an image, and a non-image portion is dissolved and removed. However, in recent years, digital technology in which a computer is used to electronically process, store and output image information is in wide use. Accordingly, a new image output process corresponding thereto is in demand. In particular, a method that does not include processing with a developer to prepare a printing plate has been studied, and a process of directly preparing a planographic printing plate with an inkjet recording ink composition is under study. This is a process where, preferably, on a surface of a hydrophilic support, ink is imagewise discharged by means of an inkjet process, followed by irradiating active radiation thereto to carry out curing, whereby a printing plate having a desired image (preferably, a hydrophobic image) is obtained. In order to form an image portion of a planographic printing plate, it is desired that an ink drop discharged on the support is rapidly cured without causing bleeding, the strength of a cured image portion and the adhesiveness thereof with respect to the support are excellent, and when the planographic printing plate is mounted on a printing machine, the image portion excellently follows the deflection of the support and therefor is not subjected to damage such as cracks. An ink composition suitable for such applications is in demand.

SUMMARY OF THE INVENTION

The invention has been made in view of the above circumstances and provides an ink composition, an inkjet recording method, a method of producing a planographic printing plate, and a planographic printing plate.

A first aspect of the invention provides an ink composition containing: (A) a polymerization initiator, (B) a polymerizable compound, (C) a colorant, and (D1) a high molecular compound having a repeating unit represented by the following formula (I).

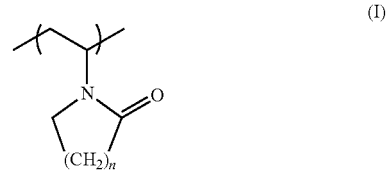

In formula (I), n represents an integer of from 1 to 5.

A second aspect of the invention provides an composition containing: (A) a polymerization initiator, (B) a polymerizable compound, (C) a colorant, and (D2) at least one compound selected from the group consisting of compounds represented by the following formula (II) and formula (III), wherein the at least one compound is contained in the ink composition in a range of from 3 to 20 mass % with respect to the total mass of the ink composition.

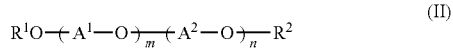

In formula (II) or formula (III), $A^1$ and $A^2$ each independently represent an alkylene group having 1 to 4 carbon atoms; $R^1$ and $R^2$ each independently represent a hydrogen atom, an alkyl group having 1 to 20 carbon atoms, an aralkyl group having 7 to 20 carbon atoms, an aryl group having 6 to 10 carbon atoms, an acyl group having 2 to 20 carbon atoms, or an allyl group; X represents an organic group having k valence; m and n each independently represent an integer of from 0 to 30, the sum of m and n in a molecule being 4 or more; and k is an integer of from 2 to 6.

A third aspect of the invention provides an inkjet recording method including: discharging the ink composition in the first or second aspect of the invention onto a recording medium; and irradiating active radiation to the discharged ink composition to cure the ink composition.

A fourth aspect of the invention provides a method of producing a planographic printing plate including: discharging the ink composition in the first or second aspect of the invention onto a hydrophilic support; and irradiating active radiation on the discharged ink composition to cure the ink composition and form a hydrophobic image that is formed by curing the ink composition on the hydrophilic support.

A fifth aspect of the invention provides a planographic printing plate that is produced according to the method of producing a planographic printing plate in the fourth aspect of the invention.

DETAILED DESCRIPTION OF THE INVENTION

<Ink Composition>

The ink composition in the first aspect of the invention contains (A) a polymerization initiator, (B) a polymerizable compound, (C) a colorant, and (D1) a high molecular compound having a repeating unit represented by formula (I).

The ink composition in the second aspect of the invention contains (A) a polymerization initiator, (B) a polymerizable compound, (C) a colorant, and (D2) at least one compound selected from the group consisting of compounds represented by the following formula (II) and formula (III). The at least one compound is contained in the ink composition in a range of from 3 to 20 mass % with respect to the total mass of the ink composition.

The ink composition of the invention is cured at high sensitivity when irradiated by radiation, and enhances the flexibility of the film formed on the ink surface. Accordingly, the ink composition of the invention is favorably used for inkjet recording.

Indispensable components of the ink composition of the invention are described in turn below.

[(D1) High Molecular Compound Having a Repeating Unit Represented by Formula (I)]

The ink composition in the first aspect of the invention contains (D1) a high molecular compound having a repeating unit represented by the following formula (I) (hereinafter, sometimes referred to as "specific polymer (D1)").

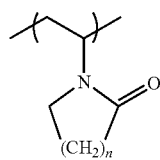

(I)

In formula (I), n represents an integer of from 1 to 5, preferably an integer of from 2 to 4, and more preferably an integer of from 2 or 4, from the viewpoints of flexibility after curing of the ink composition, adhesion to a recording medium, and availability of raw materials.

The specific polymer (D1) may be a copolymer containing a monomer component other than the repeating unit represented by formula (I). In the specific polymer (D1), another monomer component may be contained singularly or in combination of two or more kinds thereof.

The copolymerization ratio of the monomer component contained in the specific polymer (D1) is preferably 75 mol % or less, and more preferably 50 mol % or less.

Other monomer components contained in the specific polymer (D1) include those components derived from monomers (1) to (17) described below.

(1) Monomer having phenolic hydroxyl group (—Ar—OH)

Examples of monomers having a phenolic hydroxyl group include acrylamides, methacrylamides, acrylic esters and methacrylic esters each having a phenolic hydroxyl group, and hydroxystyrenes.

(2) Monomer having sulfonamide group (—SO$_2$NH—R)

Examples of monomers having a sulfonamide group include compounds having one or more sulfonamide groups having the above structure and one or more polymerizable unsaturated groups in a molecule. Preferable examples are low molecular compounds having an acryloyl group, an allyl group, or a vinyloxy group, and a sulfonamide group, in a molecule.

(3) Monomer having active imide group (—SO$_2$NHCOR, —SO$_2$NHSO$_2$R, —CONHSO$_2$R)

Examples of monomers having an active imide group include compounds having one or more unsaturated active imide groups having the above structure and one or more polymerizable unsaturated groups in a molecule. Preferable examples are compounds having one or more active imide groups represented by the following structure and one or more polymerizable unsaturated groups in a molecule. Specifically, as such a compound, N-(p-toluenesulfonyl)methacrylamide and N-(p-toluenesulfonyl)acrylamide, for example, may be suitably employed.

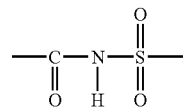

(4) Monomer having carboxylic group (—COOH)

Examples of monomers having a carboxylic group include compounds having one or more carboxylic groups and one or more polymerizable unsaturated groups in a molecule.

(5) Monomer having sulfonic group (—SO$_3$H)

Examples of monomers having a sulfonic group include compounds having one or more sulfonic groups and one or more polymerizable unsaturated groups in a molecule.

(6) Monomer having phosphoric group (—OPO$_3$H$_2$)

Examples of monomers having a phosphoric group include compounds having one or more phosphoric groups and one or more polymerizable unsaturated groups in a molecule.

In the monomers (1) to (6), Ar represents a divalent aryl connecting group possibly having a substituent, and R represents an hydrocarbon group possibly having a substituent.

(7) Acrylic esters and methacrylic esters having aliphatic hydroxyl group, such as 2-hydroxy ethyl acrylate or 2-hydroxy ethyl methacrylate.

(8) Acrylates such as methyl acrylate, ethyl acrylate, propyl acrylate, amyl acrylate, benzyl acrylate, acrylic-2-chloroethyl, glycidyl acrylate, N-dimethylamino ethyl acrylate, polyethylene glycol monoacrylate, and polypropylene glycol monoalkylate.

(9) Methacrylates such as methyl methacrylate, ethyl methacrylate, propyl methacrylate, amyl methacrylate, cyclohexyl methacrylate, benzyl methacrylate, methacrylic-2-chloroethyl, glycidyl methacrylate, N-dimethylamino ethyl methacrylate, polyethylene glycol monomethacrylate, and polypropylene glycol monomethalkylate.

(10) Acrylamides and methacrylamides such as acrylamide, metharylamide, N-methylol acrylamide, N-ethyl acrylamide, N-hexyl methacrylamide, N-cyclohexyl acrylamide, N-hydroxyethyl acrylamide, N-phenyl acrylamide, N-nitrophenyl acrylamide, and N-ethyl-N-phenyl acrylamide.

(11) Vinyl ethers such as ethyl vinyl ether, 2-chloroethyl vinyl ether, hydroxy ethyl vinyl ether, propyl vinyl ether, butyl vinyl ether, and phenyl vinyl ether.

(12) Vinyl esters such as vinyl acetate, vinyl chloroacetate, vinyl butylate, and vinyl benzoate.

(13) Styrenes such as styrene, α-methyl styrene, methyl styrene, chloromethyl styrene, and other styrene.

(14) Vinyl ketones such as methyl vinyl ketone, ethyl vinyl ketone, propyl vinyl ketone, and phenyl vinyl ketone.

(15) Olefins such as ethylene, propylene, isobutylene, butadiene, and isoprene.

(16) N-vinyl carbazole, 4-vinyl pyridine, acrylonitrile, methacrylonitrile, etc.

(17) Unsaturated imides such as maleimide, N-acryloyl acrylamide, N-acetyl methacrylamide, N-propionyl methacrylamide, and N-(p-chlorobenzoyl) methacrylamide.

Among the above monomers, the monomers (7), (8), (9), (10), (11), (12), and (13) are preferable from the viewpoints of the solubility in the ink composition and the copolymerizable property of the specific polymer (D1), and the monomers (8), (9), (11), (12) and (13) are more preferable.

Specific examples (D1-1) though (D1-20) of the specific polymer (D1) of the invention are shown below. However, the invention is not limited to these examples. In these examples, the numerical value at the lower right corner of parentheses refers to the molar ratio of each repeating unit for composing the polymer, and where numerical value is not mentioned, it means a single polymer of 100%.

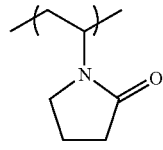

D1-1

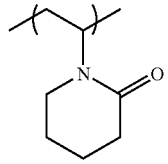

D1-2

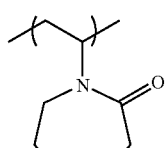

D1-3

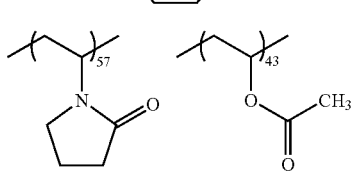

D1-4

-continued

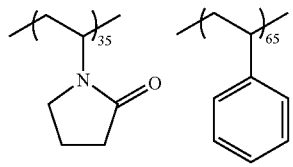

D1-5

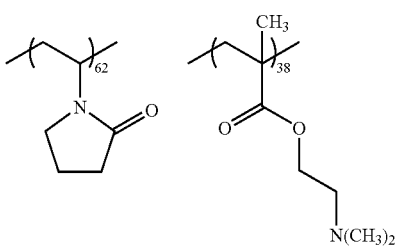

D1-6

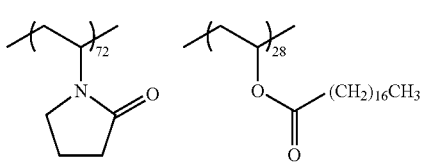

D1-7

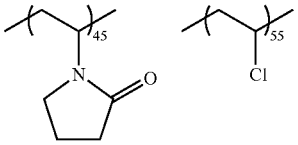

D1-8

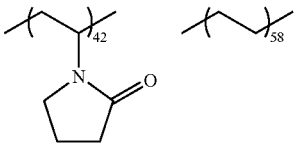

D1-9

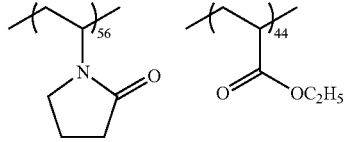

D1-10

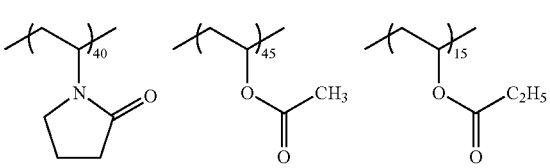

D1-11

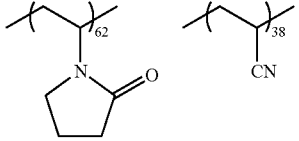

D1-12

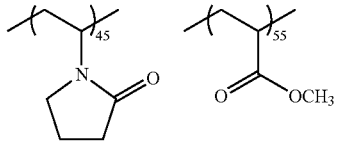

D1-13

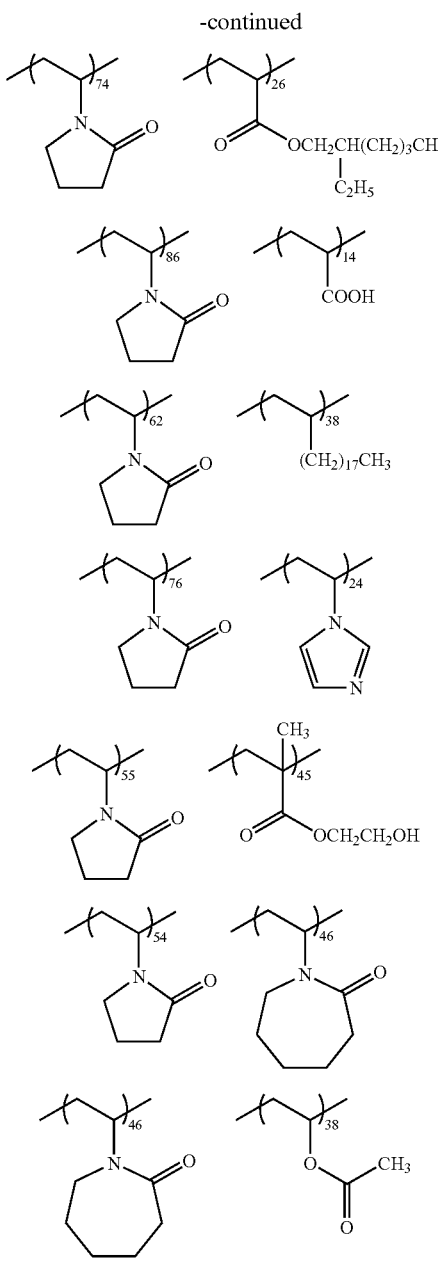

The molecular weight of the specific polymer (D1) is preferably 1,000 to 1,000,000 in weight-average molecular weight, more preferably 2,000 to 200,000, and particularly preferably 5,000 to 100,000.

The specific polymer (D1) can be polymerized by known polymerization methods. Preferable methods are radical polymerization, anion polymerization, cation polymerization, and coordination polymerization, and radical polymerization is particularly preferable because of ease of manufacture.

Reaction solvents used in the radical polymerization as required are not particularly limited as long as the above described polymer components can be dissolved. From the viewpoints of the smallness of effect on radical polymerization reaction or the solubility of each monomer, preferable examples include ketone solvents such as acetone and methyl ethyl ketone; alcohol solvents such as methanol, ethanol, isopropyl alcohol, and 1-methoxy-2-propanol; amide solvents such as N,N-dimethyl amide and N,N-dimethyl formamide; and dimethyl sulfoxide.

Polymerization initiators used as required include various thermal polymerization initiators and photo-polymerization initiators. From the viewpoints of ease of handling and availability, azo system thermal polymerization initiators are preferable. Specific examples include azonitrile compounds such as V-70, V-60, V-65 (all manufactured by Wako Pharmaceutical); aziamidine compounds such as VA-545, VA-041 (both manufactured by Wako Pharmaceutical); azoamide compounds such as VA-080, VA-082 (both manufactured by Wako Pharmaceutical); and other azo compounds such as V-601, V-501, VF-077 (all manufactured by Wako Pharmaceutical). In particular, preferable polymerization initiators are V-65 and V-601.

In polymerization, the composition of the end part or the molecular weight of the polymer may be controlled by using a known chain transfer agent represented by a mercapto compound or the like. Copolymerization components of the specific polymer (D1) may be introduced to the specific polymer (D1) either in block state or in random state.

In the ink composition in the first aspect of the invention, the content of the specific polymer (D1) with respect to the total mass of the ink composition is preferably in a range of from 1 to 20 mass %, more preferably 2 to 18 mass %, and particularly preferably 2 to 15 mass % from the viewpoints of balance of curing speed and flexibility after curing, and the suitability of ink composition to inkjets.

If the content of the specific polymer (D1) is more than 20 mass %, compatibility in an ink composition may be insufficient, or stickiness of a cured film or deterioration of flexibility may be caused. If it is less than 1 mass %, an improved effect of curing speed may not be exhibited.

The specific polymer (D1) may be used in the ink composition in the first aspect of the invention singularly or in combination of two or more kinds thereof.

[(D2) Compound Represented by Formula (II) or Formula (III)]

The ink composition in the second aspect of the invention contains (D2) at least one compound selected from the group consisting of compounds represented by the following formula (II) and formula (III)(hereinafter, sometimes referred to as "(D2) component"). The at least one compound is contained in the ink composition in a range of from 3 to 20 mass % with respect to the total mass of the ink composition

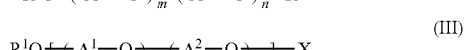

In formula (II) or (III), $A^1$ and $A^2$ each independently represent an alkylene group having 1 to 4 carbon atoms; $R^1$ and $R^2$ each independently represent a hydrogen atom, an alkyl group having 1 to 20 carbon atoms, an aralkyl group having 7 to 20 carbon atoms, an aryl group having 6 to 10 carbon atoms, an acyl group having 2 to 20 carbon atoms, or an allyl group; X represents an organic group having k valence; m and n each independently represent an integer of from 0 to 30, a sum of m and n in a molecule being 4 or more; and k is an integer of from 2 to 6.

The alkylene group having 1 to 4 carbon atoms represented by $A^1$ or $A^2$ is a methylene group, an ethylene group, a propylene group, or a butylene group. In the case of a propylene group or a butylene group, it may be either a straight chain or branched chain. From the viewpoints of miscibility with the ink composition and increase in curing speed, an alkylene group having 2 to 4 carbon atoms is preferable, an alkylene group having 2 or 3 carbon atoms, that is, an ethylene group or propylene group, is more preferable, and at least one of $A^1$ and $A^2$ being an ethylene group, that is, an alkylene group having 2 carbon atoms, is particularly preferable.

$R^1$ and $R^2$ each independently represent a hydrogen atom, an alkyl group having 1 to 20 carbon atoms, an aralkyl group having 7 to 20 carbon atoms, an aryl group having 6 to 10 carbon atoms, an acyl group having 2 to 20 carbon atoms, or an allyl group. In formula (II), at least one of $R^1$ and $R^2$ is preferably an organic group selected from the above organic group.

Preferable example of the alkyl group having 1 to 20 carbon atoms includes an alkyl group having 1 to 18 carbon atoms. Specifically, the preferable alkyl group includes an alkyl group having about 1 to 4 carbon atoms such as a methyl group, an ethyl group, and a butyl group; and an alkyl group having about 12 to 18 carbon atoms such as a lauryl group, a dodecyl group, a cetyl group, and a stearyl group.

Preferable example of the aralkyl group having 7 to 20 carbon atoms includes an aralkyl group having about 7 or 8 carbon atoms. Specifically, the preferable aralkyl group includes a benzyl group or a phenethyl group.

Preferable example of the aryl group having 6 to 10 carbon atoms includes a phenyl group or a naphthyl group.

Preferable example of the acyl group having 2 to 20 carbon atoms includes an acyl group having about 2 to 18 carbon atoms.

Preferable example of the acyl group having 2 to 20 carbon atoms includes an acetyl group, a hexanoyl group, a lauroyl group, and a stearoyl group.

These organic groups may be further substituted by other substituent. Preferable examples of the substituent include an alkyl group having about 1 to 12 carbon atoms, an alkenyl group having about 2 to 12 carbon atoms, and a halogen atom.

X represents an organic group having k valence. k is an integer of from 2 to 6, more preferably an integer of from 2 to 4, and particularly preferably an integer of from 2 or 3.

Among the organic group having k valence represented by X, preferable examples of a divalent organic group include a hydrocarbon group having about 1 to 16 carbon atoms, and an organic group having about 1 to 20 carbon atoms which contains nitrogen atom in a molecule. Preferable examples of the divalent organic group include the following organic groups.

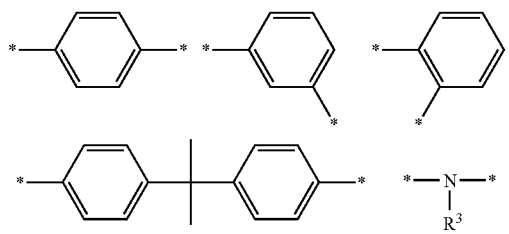

Herein, $R^3$ represents an alkyl group having 1 to 20 carbon atoms, and preferably an alkyl group having about 12 to 18 carbon atoms, such as a lauryl group or a stearyl group.

Among the organic group having k valence represented by X, preferable examples of a trivalent organic group include a hydrocarbon group represented by a glycerin derivative, and an organic group having oxygen atom in a molecule represented by a saccharide derivative. Preferable examples of the trivalent organic group include the following organic groups.

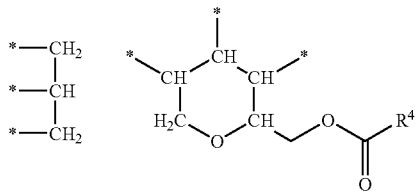

Herein, $R^4$ represents an alkyl group having 1 to 20 carbon atoms, preferably an alkyl group having about 12 to 18 carbon atoms, such as a lauryl group or a stearyl group.

m and n represent each independently represent an integer of from 0 to 30, and a sum of m and n is 4 or more, and preferably 5 or more. The sum of m and n is preferably less than 50, and more preferably less than 30.

The asterisk "*" denotes the bonding position of X and an alkylene oxide block in formula (III).

$A^1$ and $A^2$ are not the same, and the repetition form of $(A^1\text{-O})$ and $(A^2\text{-O})$ may be either random or block.

Examples (D2-1) through (D2-25) of the component (D2) preferably used in the invention are shown below. However, the invention is not limited to these examples.

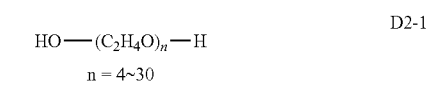

D2-1

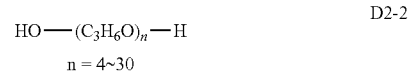

D2-2

D2-3

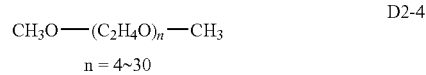

D2-4

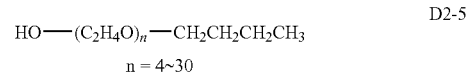

D2-5

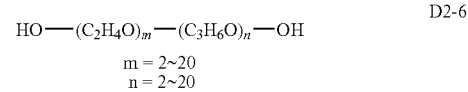

D2-6

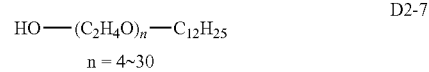

D2-7

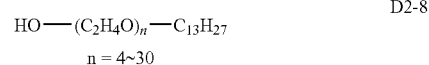

D2-8

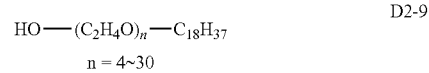

D2-9

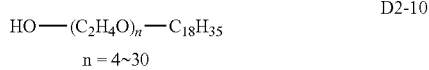

D2-10

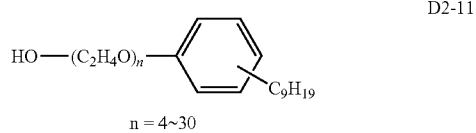

D2-11

-continued

D2-12 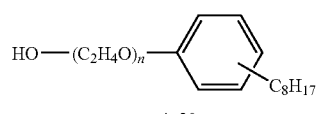
n = 4~30

D2-13 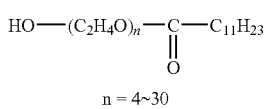
n = 4~30

D2-14 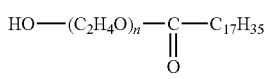
n = 4~30

D2-15 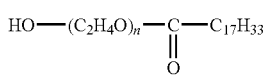
n = 4~30

D2-16 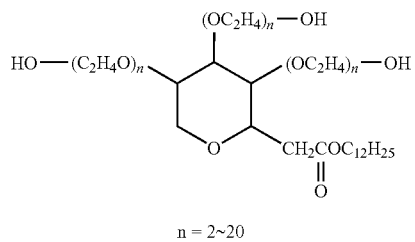
n = 2~20

D2-17 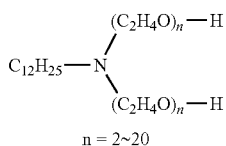
n = 2~20

D2-18 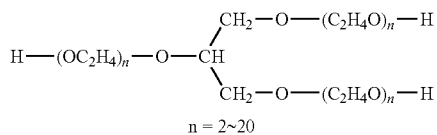
n = 2~20

D2-19 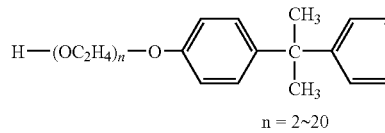
n = 2~20

D2-20 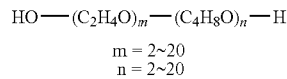
m = 2~20
n = 2~20

D2-21 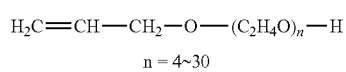
n = 4~30

D2-22 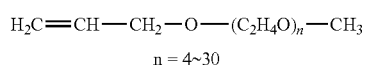
n = 4~30

D2-23 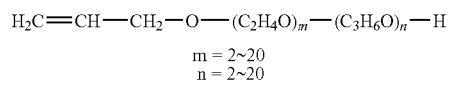
m = 2~20
n = 2~20

D2-24 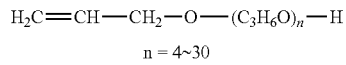
n = 4~30

D2-25 $H_2C=CH-CH_2-O-(C_3H_6O)_m-(C_2H_4O)_n-C_4H_9$
m = 2~20
n = 2~20

A content of the component (D2) in the ink composition of the invention is in a range of from 3 to 20 mass % with respect to the total mass of the ink composition, from the viewpoint of balance of curing speed and flexibility, and inkjet suitability of the ink composition, more preferably in a range of from 3 to 18 mass %, and particularly preferably in a range of from 4 to 15 mass %.

In case of the content of component (D2) is more than 20 mass %, stickiness of cured film or deterioration of flexibility may be caused, or if it is less than 3 mass %, improving effect of curing speed may not be exhibited.

The component (D2) may be used in the ink composition singularly or in a combination of two or more kinds thereof.

[(A) Polymerization Initiator]

The ink composition of the invention contains a polymerization initiator. As the polymerization initiator, known polymerization initiators can be used. In the invention, a radical polymerization initiator can be preferably used.

The polymerization initiator used in the ink composition of the invention is a compound that absorbs external energy to generate a polymerization initiation site. The external energy used to initiate a polymerization reaction is roughly divided into heat and radiation, and a thermal polymerization initiator and a photo-polymerization initiator are used, respectively. As the radiation, γ-rays, β-rays, electron beam, UV-rays, visible rays and IR-rays can be exemplified.

As the thermal polymerization initiator and the photo-polymerization initiator, known compounds can be used.

Examples of the radical polymerization initiators that can be used in the invention include (a) aromatic ketones, (b) an acylphosphine compound or acylphosphine oxide compound, (c) an aromatic onium salt compound, (d) an organic peroxide, (e) a thio compound, (f) a hexaarylbiimidazole compound, (g) a ketooxime ester compound, (h) a borate compound, (i) an azinium compound, (j) a metallocene compound, (k) an active ester compound, (l) a compounds having a carbon halogen bond and (m) an alkylamine compound.

The radical polymerization initiators in the invention may be used singularly or in a combination of two or more kinds.

The (A) polymerization initiator in the invention is contained, with respect to the total mass of the (B) polymerizable compound, preferably in a range of from 0.01 to 35 mass %, more preferably in a range of from 0.1 to 30 mass %, and still more preferably in a range of from 0.5 to 30 mass %.

Furthermore, the polymerization initiator is contained, with respect to a sensitizing dye that is described below and can be used as needed, in a mass ratio of polymerization initiator: sensitizing dye, in a range of from 200:1 to 1:200, preferably in a range of from 50:1 to 1:50, and more preferably in a range of form 20:1 to 1:5.

[(B) Polymerizable Compound]

The ink composition of the invention contains a polymerizable compound.

Polymerizable compounds that can be used in the invention include a radical polymerizable compound and a cationic polymerizable compound.

The polymerizable compound may be appropriately selected in relation to the polymerization initiator depending on the purpose and required properties.

In the first aspect of the invention, the total content of the polymerizable compound in the ink composition is preferably in a range of from 6 to 55 mass %, and more preferably in a range of from 10 to 45 mass %, with respect to the total mass of the ink composition of the invention.

In the second aspect of the invention, the total content of the polymerizable compound in the ink composition is preferably in a range of from 45 to 95 mass %, and more preferably in a range of from 50 to 90 mass %, with respect to the total mass of the ink composition of the invention.

As the radical polymerizing compound in the invention, as far as it is a compound that has a radical polymerizable ethylenic unsaturated bond at least one in a molecule, any compounds can be used. Ones having all chemical forms such as monomer, oligomer and polymer are contained. The radical polymerizing compounds may be used singularly or in a combination of two or more kinds at an arbitrary ratio in order to improve intended characteristics. Preferably, two or more kinds are used together from a viewpoint of controlling performances such as the reactivity and the physical property.

Examples of polymerization compounds having radical polymerizable ethylenic unsaturated bond include unsaturated carboxylic acids such as acrylic acid, methacrylic acid, itaconic acid, crotonic acid, isocrotonic acid and maleic acid and salts thereof, and radical polymerizable compounds such as ahhydrides having ethylenic unsaturated group, acrylonitrile, styrene, various kinds of unsaturated polyesters, unsaturated polyethers, unsaturated polyamides and unsaturated urethanes.

Specifically, examples thereof include acrylic acid-derivatives such as 2-ethylhexyl acrylate, 2-hydroxyethyl acrylate, butoxyethyl acrylate, carbitol acrylate, cyclohexyl acrylate, tetrahydrofurfuryl acrylate, benzyl acrylate, bis(4-acryloxy ethoxy phenyl)propane, neopentyl glycol diacrylate, 1,6-hexane diol diacrylate, ethylene glycol diacrylate, diethylene glycol diacrylate, triethylene glycol diacrylate, tetraethylene glycol diacrylate, polyethylene glycol diacrylate, polypropylene glycol diacrylate, pentaerythritol triacrylate, pentaerythritol tetracrylate, dipentaerythritol tetracrylate, trimethylol propane triacrylate, tetramethylol methane tetracrylate, oligoester acrylate, N-methylol acrylamide, diacetone acrylamide, epoxy acrylate; methacrylic derivatives such as methyl methacrylate, n-butyl methacrylate, 2-ethyl hexyl methacrylate, lauryl methacrylate, allyl methacrylate, glycidyl methacrylate, benzyl methacrylate, dimethylamino methyl methacrylate, 1,6-hexane diol dimethacrylate, ethylene glycol dimethacrylate, triethylene glycol dimethacrylate, polyethylene glycol dimethacrylate, polypropylene glycol dimethacrylate, trimethylol ethane trimethacrylate, trimethylol propane trimethacrylate, 2,2-bis(4-methacryloxy polyethoxy phenyl) propane; N-vinyl compounds such as N-vinyl pyrrolidone, N-vinyl caproclactam; allyl compound derivatives such as allyl glycidyl ether, diallyl phthalate, triallyl trimellitate; and, more specifically, commercially available and well-known radical polymerizable or crosslinkable monomers, oligomers and polymers described in edited by S. Yamashita et al., "Crosslinking Agent Handbook", Taisei Co., Ltd. (1981), edited by K. Kato et al., "UV, EB Curables Handbook (Materials)", Kobunshi Kankokai (1985), edited by Radotek Kenkyukai, "UV, EB Curing Technology, Application and Market", pp. 79, CMC Co. Ltd. (1989), and E. Takiyama, "Polyester Resin Handbook", Nikkan Kyogyo Shinbunsha (1988).

Furthermore, as the radical polymerizable compounds, photo-curable polymerization materials that are used in photo-polymerizable compositions described in, for instance, JP-A No. 7-159983, JP-B No. 7-31399, JP-A Nos. 8-224982, 10-863 and 9-134011 are known and these can be applied as well in the ink composition of the invention.

Furthermore, as the radical polymerizable compound, vinyl ether compounds can be preferably used. Examples of preferably usable vinyl ether compounds include di- or trivinyl ether compounds such as ethylene glycol divinyl ether, ethylene glycol monovinyl ether, diethylene glycol divinyl ether, triethylene glycol monovinyl ether, triethylene glycol divinyl ether, propylene glycol divinyl ether, dipropylene glycol divinyl ether, butane diol vinyl ether, hexane diol divinyl ether, cyclohexane dimethanol divinyl ether, hydroxyethyl monovinyl ether, hydroxynonyl monovinyl ether and trimethylolpropane trivinyl ether; and monovinyl ether compounds such as ethyl vinyl ether, n-butyl vinyl ether, isobutyl vinyl ether, octadecyl vinyl ether, cyclohexyl vinyl ether, hydroxybutyl vinyl ether, 2-ethylhexyl vinyl ether, cyclohexane dimethanol monovinyl ether, n-propyl vinyl ether, isopropyl vinyl ether, isopropenyl ether-O-propylene carbonate, dodecylvinyl ether, diethylene glycol monovinyl ether and octadecyl vinyl ether.

Of the vinyl ether compounds, the di- or tri-vinyl ether compounds and divinyl ether compounds in particular are preferred when consideration is given to curing performance, degree of adhesion and surface hardness. The vinyl ether compounds can be used singularly or in a combination of two or more appropriate kinds.

As the other polymerizing compounds, (meth)acrylic esters (hereinafter, appropriately, referred to as acrylate compound) such as (meth)acrylic monomers or prepolymers, epoxy monomers or prepolymers and urethanic monomers or prepolymers can be preferably used. More preferably, compounds below can be cited.

Examples thereof include hydroxypivalic acid neopentyl glycol diacrylate, 2-acryloyloxyethyl phthalic acid, tetramethylol methane triacrylate, 2-acryloyloxyethyl-2-hydroxyethyl phthalic acid, dimethyloltricyclodecane diacrylate, ethoxylated phenyl acrylate, 2-acryloloxydiethyl succinic acid, nonylphenol EO adduct acrylate, modified glycerin triacrylate, bisphenol A diglycidyl ether acrylic acid adduct, modified bisphenol A diacrylate, 2-acryloyloxyethylhexahydrophthalic acid, bisphenol A PO adduct diacrylate, bisphenol A EO adduct diacrylate, dipentaerythritol hexaacrylate, pentaerythritol triacrylate, tolylenediisocyanate urethane prepolymer, lactone-modified flexible acrylate, propylene glycol diglycidyl ether acrylic acid adduct, pentaerythritol triacrylate hexamethylene diisocyanate urethane prepolymer, ditrimethylolpropane tetraacrylate, pentaerythritol triacrylate hexamethylene diisocyanate urethane prepolymer, stearyl acrylate, isoamyl acrylate, isomyristyl acrylate, isostearyl allylacrylate and lactone-modified acrylate.

The acrylate compounds, in comparison with polymerizing compounds that have been used in existing UV-curable ink, are smaller in the dermal irritancy and sensitizing property (irritability), can relatively lower the viscosity, can obtain more stable ink dischargeability and are more excellent in the polymerization sensitivity and the adhesiveness with a recording medium.

Furthermore, monomers cited here, in spite of low molecular weight, are small in the sensitizing property, high in the reactivity, low in the viscosity and excellent in the adhesiveness with the recording medium.

In order to further improve the sensitivity, lower the bleeding and improve the adhesiveness with the recording medium, monoacrylate containing the (B) component and polyfunctional acrylate monomer or polyfunctional acrylate oligomer having a molecular weight of 400 or more, preferably 500 or more can be preferably used together.

In particular, in an ink composition that is used to record on a flexible recording medium such as a PET film or PP film, when monoacrylate selected from a group of the compounds, one kind selected from the (B) components and the polyfunctional acrylate monomer or polyfunctional acrylate oligomer are used together, while imparting the flexibility to the film and improving the adhesiveness with the film, the film strength can be preferably heightened.

Furthermore, a mode where at least three kinds of polymerizing compounds of a mono-functional monomer, a bifunctional monomer and a polyfunctional monomer of trifunctional or more are used together can be cited as a preferable mode from a viewpoint of, while maintaining the safety, further improving the sensitivity, lowering the bleeding and improving the adhesiveness with the recording medium.

As the monoacrylate, stearyl acrylate, isoamyl acrylate, isomyristyl acrylate and isostearyl acrylate can be preferably used from a viewpoint in that the sensitivity is high, the contractile property is small to be capable of inhibiting curl from occurring, the bleeding can be inhibited, odor of printed matter can be inhibited and an illumination device can be reduced in the cost.

As the oligomer that can be used together with the monoacrylate, epoxy acrylate oligomer and urethane acrylate oligomer are particularly preferable.

The methacrylate is lower in the skin irritancy than the acrylate.

Among the compounds, when alkoxy acrylate is used at an amount of 70 mass percent or less and a balance is acrylate, excellent sensitivity, the bleed inhibition characteristics and the odor inhibition characteristics can be preferably obtained.

In the first aspect of the ink composition of the invention, when the acrylate compound is used as the polymerizable compound, the content of the acrylate compound is preferably 30 mass % or more with respect to the total mass of the polymerizable compound (that is, the total content of the polymerizable compound), more preferably 40 mass % or more, and still more preferably 50 mass % or more. Furthermore, all of the polymerizable compound in the ink composition may be made the acrylate compound.

In the second aspect of the ink composition, when the acrylate compound is used as the polymerizable compound, a content of the acrylate compound is preferably 30 mass % or more with respect to the total mass of the polymerizable compound[that is, in a total content of polymerizable compound], more preferably 40 mass % or more, and still more preferably 50 mass % or more. Furthermore, all of the polymerizable compound in the ink composition may be made the acrylate compound.

In the invention, as to the selection of the polymerization initiator and polymerizable compound, in accordance with various objects (for instance, as a countermeasure for inhibiting the sensitivity from deteriorating owing to a shielding effect of a colorant that is used in ink composition), other than a combination of the radical polymerizable compound and the radical polymerization initiator, a radical and cation hybrid type curable ink composition where, together with the above, a radical/cation hybrid type curable ink composition where a cationic polymerizable compound and a cationic polymerization initiator such as shown below are used together may be formed.

The cationic polymerizable compound that can be used in the invention, as far as it is a compound that starts a polymerization reaction due to an acid generated from a photo-acid generating agent to cure, is not particularly restricted. Various kinds of known cationic polymerizable monomers known as cationic photopolymerizable monomers can be used. As the cationic photopolymerizable monomers, epoxy compounds, vinyl ether compounds and oxetane compounds described in, for instance, JP-A Nos. 6-9714, 2001-31892, 2001-40068, 2001-55507, 2001-310938, 2001-310937 and 2001-220526 can be cited.

Furthermore, as the cationic polymerizable compounds, polymerizable compounds that are applied to, for instance, cationic polymerizable photo-curable resins are known. Recently, the polymerizable compounds that can be applied to cationic photopolymerizable photo-curable resins that are sensitized in a visible wavelength region of 400 nm or more are disclosed in, for instance, JP-A Nos. 6-43633 and 8-324137. These as well can be applied to the ink composition of the invention.

In the invention, as the cationic polymerization initiators (photo-acid generating agents) that can used together with the cationic polymerizable compounds, for instance, chemical amplification type photoresist or compounds that are used in cationic photopolymerization are used ("Imaging-Yo Yuuki Zairyo (Organic Material for Imaging)", edited by Yuuki Electronics Zairyo Kenkyukai, published by Bunshin Shuppan (1993), pages 187-192.

Examples of suitable cationic polymerization initiator will be shown below.

That is, firstly, $B(C_6F_5)_4^-$, $PF_6^-$, $AsF_6^-$, $SbF_6^-$ or $CF_3SO_3^-$ salt of aromatic onium compounds such as diazonium, ammonium, iodonium, sulfonium and phosphonium can be cited. Secondly, sulfonated compounds that generate a sulfonic acid can be cited. Thirdly, a halide that photo-generates hydrogen halide can be used as well. Fourthly, an iron arene complex can be cited.

The cationic polymerization initiators such as mentioned above may be used singularly or in a combination of two or more kinds.

[(C) Colorant]

The ink composition of the invention contains a colorant.

As the colorant that can be used in the invention is not particularly restricted. However, a (C-1) pigment and a (C-2) oil-soluble dye excellent in the weather resistance and rich in the color reproducibility are preferable. An arbitrary known colorant such as a dissolvable dye can be selected and used. As the colorant that can be preferably used in the ink composition according to the invention, from viewpoint of not lowering the sensitivity to a curing reaction owing to active radiation, a compound that does not work as a polymerization inhibitor in the polymerization reaction that is a curing reaction is preferable.

(C-1) Pigment

As the pigment that can be used in the invention, though not particularly restricted, organic or inorganic pigments having numbers below described in, for instance, color index can be used.

Examples of red or magenta pigments include Pigment Red 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226 and 257; Pigment Violet 3, 19, 23, 29, 30, 37, 50 and 88; and Pigment Orange 13, 16, 20 and 36.

Examples of blue or cyan pigments include Pigment Blue 1, 15, 15:1, 15:2, 15:3, 15:4, 15:6, 16, 17-1, 22, 27, 28, 29, 36 and 60.

Examples of green pigments include Pigment Green 7, 26, 36 and 50.

Examples of yellow pigments include Pigment Yellow 1, 3, 12, 13, 14, 17, 34, 35, 37, 55, 74, 81, 83, 93, 94, 95, 97, 108, 109, 110, 137, 138, 139, 153, 154, 155, 157, 166, 167, 168, 180, 185 and 193.

Examples of black pigments include Pigment Black 7, 28 and 26.

Examples of white pigments include Pigment White 6, 18 and 21.

The pigments can be used depending on applications.

(C-2) Oil-Soluble Dye

The oil-soluble dye that can be used in the invention is described below.

The oil-soluble dye that can be used in the invention means a substantially water-insoluble dye. Specifically, the oil-soluble dye indicates one of which solubility in water at 25° C. (a mass of a dye that can be dissolved in 100 g water) is 1 g or less, preferably 0.5 g or less and more preferably 0.1 g or less. Accordingly, the oil-soluble dye means a so-called water-insoluble pigment and oil-soluble dye. Among these, the oil-soluble dyes are preferable.

Among the oil-soluble dyes that can be used in the invention, as a yellow dye, an arbitrary one can be used. Examples thereof include an aryl or heteryl azo dye having, for instance, phenols, naphthols, anilines, pyrazolones, pyridones or open-chain active methylene compounds as a coupling component; an azomethine dye having, for instance, open-chain active methylene compounds as the coupling component; a methine dye such as a benzylidene dye or a monomethine oxonol dye; a quinone dye such as a naphthoquinone dye or an anthraquinone dye; and, as other dye species, a quinophtharone dye, a nitro and nitroso dye, a acridine dye, or an acridinone dye.

Among the oil-soluble dyes that can be used in the invention, as the magenta dye, an arbitrary one can be used. Examples of the magenta dyes include an aryl or heteryl azo dye having, for instance, phenols, naphthols or anilines as a coupling component; an azomethine dye having, for instance, pyrazolones or pyrazolotriazoles as a coupling component; a methine dye such as an arylidene dye, styryl dye, merocyanine dye or oxonol dye; a carbonium dye such as a diphenylmethane dye, a triphenylmethane dye or a xanthene dye; a quinone dye such as naphthoquinone, anthraquinone or anthrapyridone; and a condensed polycyclic dye such as a dioxazine dye.

Among the oil-soluble dyes that can be used in the invention, as the cyan dye, an arbitrary one can be used. Examples of the cyan dyes include an indoaniline dye; an indophenol dye; an azomethine dyes having pyrolotriazoles as a coupling component; a polymethine dye such as a cyanine dye, an oxonol dye or a merocyanine dye; a carbonium dye such as a diphenylmethane dye, a triphenylmethane dye or a xanthene dye; a phthalocyanine dye; an anthraquinone dye; an aryl or heteryl azo dye having, for instance, phenols, naphthols or anilines as the coupling component; and an indigo and thioindigo dye.

Each of the dyes may be one that develop a color such as yellow, magenta or cyan only when a chromophore is partialy dissociated; and in such a case, a counter cation may be an inorganic cation such as an alkali metal or ammonium, an organic cation such as pyridinium or quaternary ammonium salt, or a cationic polymer having the above a partial structure.

Though not restricted to following ones, preferable specific examples include C. I. Solvent Black 3, 7, 27, 29 and 34; C.I. Solvent Yellow 14, 16, 19, 29, 30, 56, 82, 93 and 162; C.I. Solvent Red 1, 3, 8, 18, 24, 27, 43, 49, 51, 72, 73, 109, 122, 132 and 218; C.I. Solvent Violet 3; C.I. Solvent Blue 2, 11, 25, 35, 38, 67 and 70; C.I. Solvent Green 3 and 7; and C.I. Solvent Orange 2.

Particularly preferable ones among them include Nubian Black PC-0850, Oil Black HBB, Oil Yellow 129, Oil Yellow 105, Oil Pink 312, Oil Red 5B, Oil Scarlet 308, Vali Fast Blue 2606, and Oil Blue BOS (manufactured by Orient Chemical Industries); Aizen Spilon Blue GNH (manufactured by Hodogaya Chemical Co., Ltd.); Neopen Yellow 075, Neopen Magenta SE1378, Neopen Blue 808, Neopen Blue FF4012, and Neopen Cyan FF4238 (manufactured by BASF Corp.).

In the invention, the oil-soluble dyes may be used singularly or in a combination of a plurality of kinds.

Furthermore, when the oil-soluble dye is used as a colorant, within an extent that does not disturb the advantages of the invention, as needs arise, a colorant such as other water-soluble dye, a disperse dye or a pigment can be used together.

In the invention, a disperse dye may be used as well in such an amount that can be dissolved in a water-immiscible organic solvent. The disperse dye generally includes a water-soluble dye. However, in the invention, the disperse dye is preferably used within a range that can be dissolved in a water-immiscible organic solvent. Preferable specific examples of the disperse dyes include C.I. Disperse Yellow 5, 42, 54, 64, 79, 82, 83, 93, 99, 100, 119, 122, 124, 126, 160, 184:1, 186, 198, 199, 201, 204, 224 and 237; C.I. Disperse Orange 13, 29, 31:1, 33, 49, 54, 55, 66, 73, 118, 119 and 163; C.I. Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356 and 362; C.I. Disperse Violet 33; C.I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365 and 368; and C.I. Disperse Green 6:1 and 9.

The colorant that can be used in the invention is, after added to the ink composition of the invention, preferably suitably dispersed in the ink composition. When the colorant is dispersed, various kinds of dispersers such as a ball mill, sand mill, attritor, roll mill, agitator, Henshel mixer, colloid mill, supersonic homogenizer, pearl mill, wet jet mill and paint shaker can be used.

Furthermore, when the colorant is dispersed, a dispersant can be added. The dispersant is not particularly restricted in the kind. However, a polymer dispersant can be preferably used. As the polymer dispersant, for instance, Solsperse series (trade name, produced by Noveon Corp.) can be cited. Still furthermore, as a dispersion aide, a synergist corresponding to each of the pigments can be used. In the invention, the dispersant and dispersing aide are preferably added from 1 to 50 parts by weight based on 100 parts of the colorant.

The colorant may be directly added to and blended with the ink composition of the present invention together with respective components at the preparation of the ink composition. However, in order to improve the dispersibility, they may be previously added to a dispersing medium such as a solvent or the (B) component used in the invention or (D) other polymerizable compound used together as needs arise to uniformly disperse or dissolve, followed by blending.

In the invention, in order to avoid problems of the deterioration of the solvent resistance when the solvent remains in the cured image and the VOC (Volatile Organic Compound) of the remaining solvent, the colorant is preferably previously added to any one of the polymerizable compounds including the (B) component or a mixture thereof to blend. Moreover, when a viewpoint of the dispersion aptitude alone is considered, as the polymerizing compound used to add the colorant, monomers with the lowest viscosity are preferably selected.

The colorants, depending on the applications of the ink composition, can be appropriately selected to use singularly or in a combination thereof.

When a colorant such as a pigment that remains as solid in the ink composition of the invention is used, in order that an average particle size of colorant particle may be, for the first embodiment, preferably in the range of 0.005 to 0.5 μm, more preferably in the range of 0.01 to 0.45 μm and still more preferably in the range of 0.015 to 0.4 μm, for the second embodiment, preferably in the range of 0.005 to 1.5 μm, more preferably in the range of 0.01 to 1.2 μm and still more preferably in the range of 0.015 to 1.0 μm, and, for the third embodiment, preferably in the range of 0.005 to 1.5 μm, more preferably in the range of 0.01 to 1.2 μm and still more preferably in the range of 0.015 to 1.0 μm, it is preferable that the colorant, dispersant and dispersion medium are selected and dispersion conditions and filtering conditions are set. When the particle size is thus managed, a head nozzle can be inhibited from clogging, and the storage stability of ink, the transparency of ink and the curing sensitivity of ink can be maintained.

A content of the colorant in the ink composition of the invention is appropriately selected depending on applications thereof. However, when the ink physical property and the coloring property are considered, in general, the content of the colorant to a mass of an entire ink composition is preferably set in the range of 1 to 10 mass percent and more preferably in the range of 2 to 8 mass percent.

In the ink composition according to the invention, in addition to the above indispensable components, as far as it does not disturb advantages of the invention, in order to improve the physical property, other components can be used together.

These arbitrary components will be described below.

[(E) Sensitizing Dye]

In the ink composition of the invention, in order to promote decomposition due to active ray irradiation of the polymerization initiator, a sensitizing dye may be added. The sensitizing dye absorbs a particular active radiation to form an electronically excited state. The electronically-excited sensitizing dye comes into contact with a polymerization initiator to generate actions such as electron transfer, energy transfer and heat generation, thereby a chemical change of the polymerization initiator, that is, decomposition and generation of radicals, acids or bases are forwarded.

As the sensitizing dye, a compound corresponding to an wavelength of the active radiation that makes a polymerization initiator that is used in the ink composition generate an initiation seed can be used. However, considering that the sensitizing dye is used in a curing reaction of a general ink composition, as preferable examples of the sensitizing dyes, ones that belong to compound groups below and have an absorption wavelength in the range of 350 to 450 nm can be cited.

Examples thereof include polynuclear aromatics (for instance, anthracene, pyrene, perylene and triphenylene), thioxanthones (for instance and isopropyl thioxanthone), xanthenes (for instance, fluorescein, eosin, erythrosin, rhodamine B and rose bengal), cyanines (for instance, thiacarbocyanine and oxacarbocyanine), merocyanines (for instance, merocyanine and carbomerocyanine), thiazines (for instance, thionine, methylene blue and toluidine blue), acridines (for instance, acridine orange, chloroflavin and acriflavine), anthraquinones (for instance, anthraquinone), squaliums (for instance, squalium) and coumarins (for instance, 7-diethylamino-4-methylcoumarin), the polynuclear aromatics and thioxanthenes being cited as preferable ones.

More preferable examples of sensitizing dyes include compounds represented by the following formulae (IV) to (VIII).

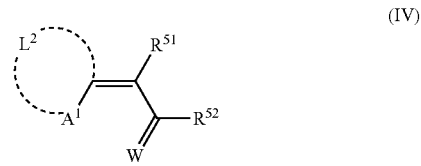

(IV)

In formula (IV), $A^1$ represents a sulfur atom or $NR^{50}$; $R^{50}$ represents an alkyl group or an aryl group; $L^2$ represents a non-metal atom group that forms a basic nucleus of a dye in association with an adjacent $A^1$ and an adjacent carbon atom; $R^{51}$ and $R^{52}$ each independently represent a hydrogen atom or a monovalent non-metal atom group; $R^{51}$ and $R^{52}$ may bond each other to form an acidic nucleus of a dye; and W represents an oxygen atom or a sulfur atom.

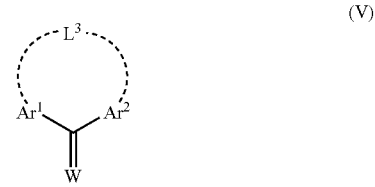

(V)

In formula (V), $Ar^1$ and $Ar^2$ each independently represent an aryl group, and are bound each other through a bond due to -$L^3$-; $L^3$ represents —O— or —S—; W has the same definition as in formula (IV).

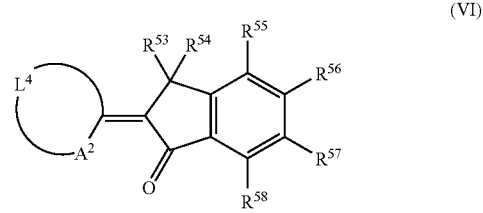

(VI)

In formula (VI), $A^2$ represents a sulfur atom or $NR^{59}$; $L^4$ represents a non-metal atom group that forms a basic nucleus of a dye in association with an adjacent $A^2$ and an adjacent carbon atom; $R^{53}$, $R^{54}$, $R^{55}$, $R^{56}$, $R^{57}$ and $R^{58}$ each independently represents a monovalent non-metal atom group; and $R^{59}$ represents an alkyl group or an aryl group.

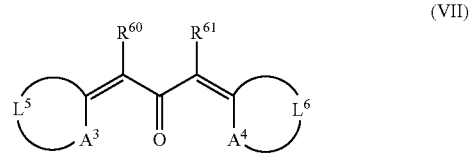

(VII)

In formula (VII), $A^3$ and $A^4$ each independently represent —S— or —$NR^{62}$— or —$NR^{63}$—; $R^{62}$ and $R^{63}$ each independently represent substituted or non-substituted alkyl group, or substituted or non-substituted aryl group; $L^5$ represents a non-metal atom group that forms a basic nucleus of a dye in association with an adjacent $A^3$ and an adjacent carbon atom; $L^6$ represents a non-metal atom group that forms a basic nucleus of a dye in association with an adjacent $A^4$ and an adjacent carbon atom; and $R^{60}$ and $R^{61}$ each independently represent a hydrogen atom or a monovalent non-metallic atomic group, and may be bonded each other to form an aliphatic or aromatic ring.

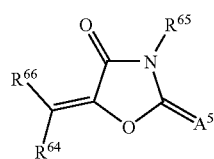

(VIII)

In formula (VIII), $R^{66}$ represents an aromatic ring or a hetero ring that may have a substituent group; $A^5$ represents an oxygen atom, a sulfur atom, or $=NR^{67}$; $R^{64}$, $R^{65}$, and $R^{67}$ each independently represent a hydrogen atom or a monovalent non-metal atom group; and $R^{67}$ and $R^{64}$, and $R^{65}$ and $R^{67}$ may be bonded each other to form an aliphatic or aromatic ring.

As the preferable examples of compounds represented by formulae (IV) to (VIII) are shown below.

(E-1)

(E-2)

(E-3)

(E-4)

-continued

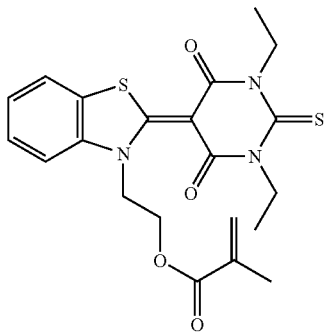

(E-5)

(E-6)

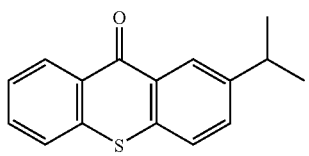

(E-7)

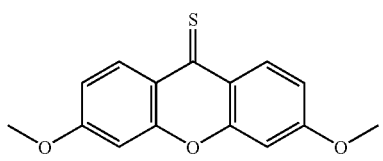

(E-8)

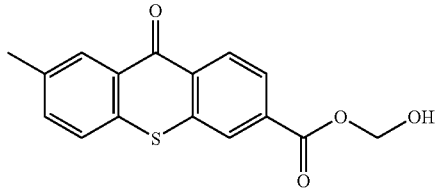

(E-9)

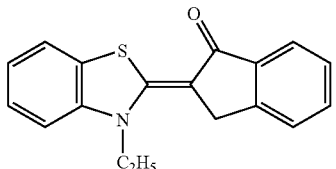

(E-10)

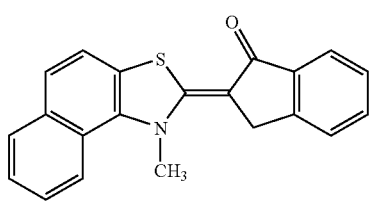

(E-11)

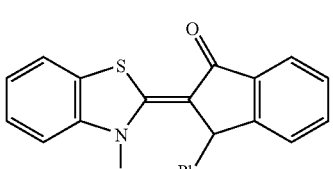

(E-12)

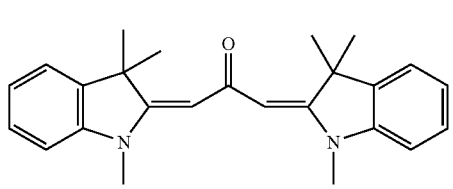

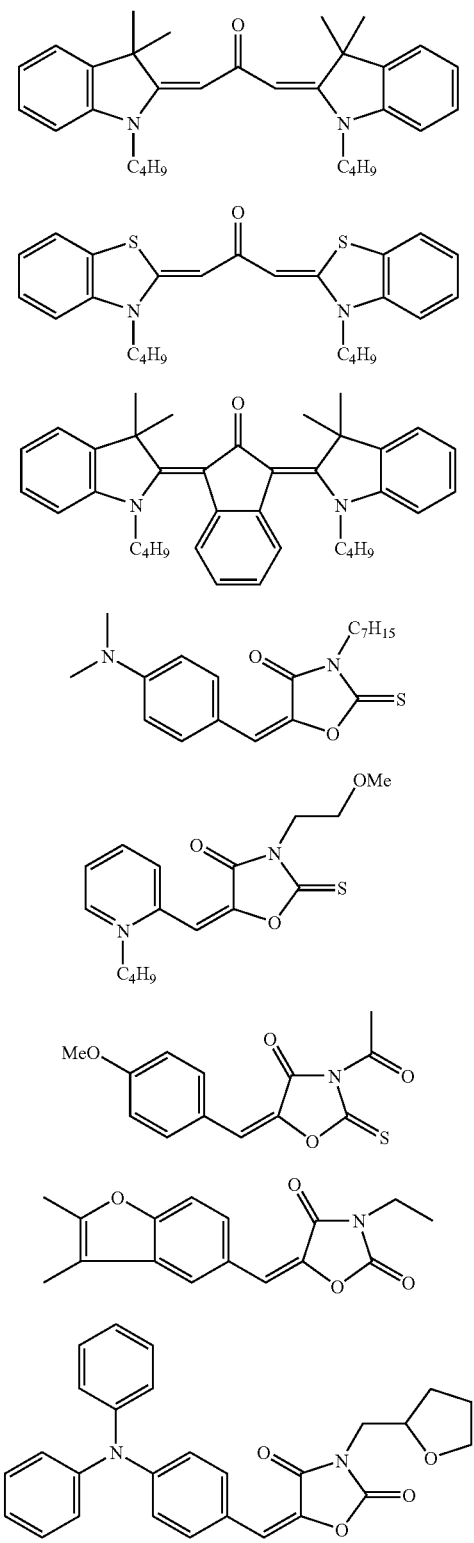

[(F) Cosensitizing Agent]

The ink composition of the invention may contain a cosensitizing agent. In the invention, the cosensitizing agent further improves the sensitivity to active radiation of the sensitizing dye or inhibits oxygen from disturbing a polymerization reaction of a polymerizing compound.

The ink composition of the invention can contain a cosensitizing agent. In the invention, the cosensitizing agent further improves the sensitivity to active radiation of the sensitizing dye or inhibits oxygen from disturbing a polymerization reaction of a polymerizing compound.

Examples of such cosensitizing agents include amines, for instance, compounds described in M. R. Sander et al., Journal of Polymer Society, Vol. 10, p. 3173 (1972), JP-B-44-20189, JP-A Nos. 51-82102, 52-134692, 59-138205, 60-84305, 62-18537 and 64-33104, and Research Disclosure No. 33825, and specifically, include triethanolamine, p-dimethylaminobenzoic acid ethyl ester, p-formyldimethylaniline and p-methylthiodimethylaniline.

Other examples of the cosensitizing agents include thiols and sulfides, for instance, thiol compounds described in JP-A No. 53-702, JP-B No. 55-500806 and JP-A No. 5-142772, disulfide compounds described in JP-A-56-75643, and specifically, 2-mercaptobenzothiazole, 2-mercaptobenzoxazole, 2-mercaptobenzimidazole, 2-mercapto-4(3H)-quinazoline and β-mercaptonaphthalene.

Further other examples include amino acid compounds (for instance, N-phenylglycine), organometallic compounds described in JP-B No. 48-42965 (for instance, tributyltinacetate), hydrogen donors described in JP-B No. 55-34414, sulfur compounds described in JP-A No. 6-308727 (for instance, trithiane), phosphorus compounds described in JP-A No. 6-250387 (for instance, diethylphosphite) and Si—H, Ge—H compounds described in JP-A No. 8-65779.

[(G) Other Components]

In the ink composition of the invention, as needs arise, other components can be added. As the other components, for instance, a polymerization inhibitor and a solvent can be cited.

The polymerization inhibitor can be added to improve the storage stability. Furthermore, when the ink composition of the invention is used as an ink composition for inkjet recording, the ink composition is preferably discharged after heating to a temperature in the range of 40 to 80° C. to lower the viscosity. Accordingly, in order to inhibit as well a head from being clogged due to thermal polymerization, the polymerization inhibitor is preferably added. The polymerization inhibitor is added, to a total amount of the ink composition of the invention, preferably in the range of 200 to 20,000 ppm. As the polymerization inhibitor, for instance, hydroquinone, benzoquinone, p-methoxyphenol, TEMPO, TEMPOL and cupferron Al can be cited.

Considering that the ink composition according to the invention is a radiation-curable ink composition, the composition preferably contains no solvent so that the reaction may occur immediately after deposition to cure the ink composition. However, the ink composition may contain a predetermined solvent as long as it does not affect on the curing speed of ink composition. The solvent may be an organic solvent or water in the invention. In particular, an organic solvent may be added to improve the adhesiveness with the recording medium (support such as paper). Addition of an organic solvent is effective for the prevention of the problem of VOC.

An amount of the organic solvent is, for instance, in the range of 0.1 to 5 mass percent and preferably in the range of 0.1 to 3 mass percent to a mass of a whole ink composition of the invention.

In addition, known compounds may be added to the ink composition according to the invention as necessary. Examples of such additional compounds include a surfactant, a leveling additive, a matting agent, and a resin for adjusting film physical properties such as a polyester resin, a polyurethane resin, a vinyl resin, an acrylic resin, a rubber-based resin or a wax. Furthermore, a tackifier that does not disturb a polymerization reaction is preferably added in view of the improvement in the adhesiveness with recording media such as polyolefin or PET. Specific examples thereof include high-molecular weight adhesive polymers described in JP-A No. 2001-49200, pp. 5 to 6 (for instance, copolymers made of an ester of (meth)acrylic acid and alcohol having an alkyl group having 1 to 20 carbon atoms, an ester of (meth)acrylic acid and alicyclic alcohol having 3 to 14 carbon atoms and as ester of (meth)acrylic acid and of aromatic alcohol having 6 to 14 carbon atoms), and low-molecular weight tackiness-imparting resins having a polymerizable unsaturated bond.

[Property of Ink Composition]

The ink composition of the invention can be preferably used as inkjet recording ink. Preferable physical properties in such usage modes will be described below.

When an ink composition is used as ink for inkjet recording, in view of the dischargeability, at a temperature during the discharge (for instance, 40 to 80° C., preferably 35 to 50° C.), the viscosity is preferably in the range of 7 to 30 mPa·s and more preferably in the range of 7 to 25 mPa·s. For instance, the viscosity at room temperature (25° C.) of the ink composition of the invention is preferably in the range of 35 to 500 mPa·s and more preferably in the range of 35 to 200 mPa·s.

The ink composition according to the invention is preferably appropriately adjusted in a composition ratio so that the viscosity may be in the above range. When the viscosity at room temperature is set high, even when a porous recording medium is used, ink can be avoided from permeating into the recording medium, and thereby uncured monomer can be reduced and odor can be reduced. Furthermore, when an ink drop is deposited, the ink can be inhibited from bleeding, resulting in improving image quality.

The surface tension of the ink composition of the invention is preferably in the range of 20 to 30 mN/m and more preferably in the range of 23 to 28 mN/m. When the ink composition is recorded on various recording media such as polyolefin, PET, coated paper and non-coated paper, from a viewpoint of the bleeding, the surface tension is preferably 20 mN/m or more, and from a viewpoint of the wettability the surface tension is preferably 30 mN/m or less.

<Inkjet Recording Method>

An inkjet recording method of the invention, and an inkjet recording system that can be applied to the inkjet recording method will be described below.

An inkjet recording method of the invention is a method where an ink composition of the invention is discharged on a recording medium (support, recording material, or the like) for inkjet recording and active radiation is irradiated on the ink composition discharged on the recording medium to cure the ink to form an image.

That is, the inkjet recording method of the invention includes discharging the ink composition in the first or second aspect of the invention onto a recording medium ((a) process); and irradiating active radiation to the discharged ink composition to cure the ink composition ((b) process).

In the inkjet recording method of the invention, when the (a) and (b) processes are included, owing to the ink composition cured on the recording medium, an image is formed.

In the (a) process in the inkjet recording process of the invention, an inkjet recording system detailed below can be used.

[Inkjet Recording System]

An inkjet recording system that can be used in the inkjet recording method of the invention is not particularly restricted. A known inkjet recording system that can achieve intended resolution can be arbitrarily selected and used. That is, all known inkjet recording systems including commercially available ones can discharge ink on a recording medium in the (a) process in the inkjet recording method of the invention.

As the inkjet recording system that can be used in the invention, for instance, a system including an ink supply system, a temperature sensor and an active radiation source can be cited.

The ink supply system includes, for example, a stock tank storing the ink composition according to the invention, a supply pipe, an ink supply tank immediately before an inkjet head, a filter, and a piezoelectric inkjet head. The piezoelectric inkjet head can be operated so that the discharge may be conducted at the resolution of, for instance, 320×320 to 4,000×4,000 dpi, preferably, 400×400 to 1,600×1,600 dpi and more preferably 720×720 dpi to form multi-sized dots of 1 to 100 pl and preferably 8 to 30 pl. The unit "dpi" in the invention means the number of dots per 2.54 cm.

As described above, in the radiation-curable ink like the ink composition according to the invention, the temperature at the time of discharge is preferably maintained constant. Accordingly, the region from the ink supply tank to the inkjet head is preferably thermally insulated and heated. The method of controlling the temperature is not particularly restricted. However, for instance, a temperature sensor is preferably disposed to each of a plurality of piping sites to apply heating control corresponding to the flow rate of ink and the environmental temperature. The temperature sensors may be disposed in the ink supply tank and near the nozzles of the inkjet head. In addition, the heating head unit is preferably thermally shielded or insulated so as to minimize the environmental influence on the system. It is preferable to insulate the head unit from other units and reduce the heat capacity of the entire heating unit in order to shorten the start-up time needed for heating or in order to reduce the loss of heat energy.

The ink composition of the invention is preferably discharged after, by use of the above-mentioned ink-jet recording system the ink composition is heated to a temperature preferably in the range of 40 to 80° C. and more preferably in the range of 35 to 50° C. to lower the viscosity of the ink composition preferably in the range of 7 to 30 mPa·s and more preferably in the range of 7 to 25 mPa·s. In particular, when, as the ink composition of the invention, one of which viscosity at 25° C. is in the range of 35 to 500 mPa·s is used, a large advantage can be preferably obtained. When the method is used, high discharge stability can be realized.

The radiation-curable ink composition like the ink composition of the invention is generally high in the viscosity than that of aqueous ink that is used in ordinary ink-jet recording ink; accordingly, during the discharge, the viscosity largely varies with temperature. The viscosity variation of the ink largely affects to alter a liquid drop size and a liquid drop discharge speed, resulting in deteriorating image quality. Accordingly, the ink temperature during the discharge has to be maintained as constant as possible. Accordingly, in the invention, the ink temperature is set with a width of setting temperature ±5° C., preferably setting temperature ±2° C. and more preferably setting temperature ±1° C.

In the next place, (b) a process of irradiating active radiation on a discharged ink composition to cure the ink composition will be described.

The ink composition discharged on the recording medium is cured when active radiation is irradiated thereon. This is because the polymerization initiator contained in the ink composition of the invention, upon irradiation of active radiation, is decomposed to generate initiation seeds such as radical, acid or base to cause and promote, owing to an action of the initiation seed, a polymerization reaction of the component and the other polymerizable compound that is used together as needs arise. At this time, when, in the ink composition, the polymerization initiator and the sensitizing dye are present together, the sensitizing dye in the system absorbs active radiation to be raised to an excited state. The excited sensitizing dye, when coming into contact with the polymerization initiator, promotes the decomposition of the polymerization initiator to realize a higher sensitivity curing reaction.

Here, the active radiation that is used includes α-rays, γ-rays, electron beam, X-rays, UV-rays, visible rays or IR rays. A peak wavelength of the active radiation is, through depending on the absorption characteristics of the sensitizing dye, preferably in the range of 200 to 600 nm, more preferably in the range of 300 to 450 nm and still more preferably in the range of 350 to 420 nm.

Furthermore, a polymerization initiation system of the ink composition of the invention has sufficient sensitivity even to a low output active radiation. Accordingly, an output of the active radiation is preferably 2,000 mJ/cm$^2$ or less, more preferably in the range of 10 to 2,000 mJ/cm$^2$, still more preferably in the range of 20 to 1,000 mJ/cm$^2$ and particularly preferably in the range of 50 to 800 mJ/cm$^2$.

Furthermore, the active radiation is irradiated at the exposed surface illuminance in the range of 10 to 2,000 mW/cm$^2$ and preferably in the range of 20 to 1,000 mW/cm$^2$.

Mercury lamps, gaseous or solid state lasers and the like are widely used as the active radiation sources, and mercury lamps and metal halide lamps are widely used for UV-curing inkjet recording ink. However, under the current strong needs for the elimination of the use of mercury from the viewpoint of environmental protection, it is very important industrially and environmentally to replace mercury lamps with GaN-type semiconductor UV-emitting devices. In addition, LED's (UV-LED) and LD's (UV-LD) are smaller in size, longer in lifetime, higher in efficiency, and lower in cost, and thus, attracting attention as light sources for radiation-curing inkjet printers.

Furthermore, a light-emitting diode (LED) and a laser diode (LD) can be used as the active radiation source. An ultraviolet LED or an ultraviolet LD may be used when an ultraviolet ray source is required. For example, a purple LED having a main emission spectrum in the wavelength range of 365 to 420 nm is available from Nichia Corporation. As to a light source having a still shorter wavelength, U.S. Pat. No. 6,084,250 discloses an LED capable of radiating active radiation having a main emission spectrum in the wavelength range of 300 to 370 nm. Other ultraviolet LED's are also commercially available, and capable of emitting radiations of different UV ranges. The radiation source used in the invention is preferably a UV-LED, and particularly preferably a UV-LED having a peak wavelength in the range of 350 to 420 nm.

The maximum illuminance of LED light on the image recording medium is preferably from 10 to 2,000 mW/cm$^2$, more preferably from 20 to 1,000 mW/cm$^2$, and particularly preferably from 50 to 800 mW/cm$^2$.

The ink composition of the invention is irradiated by such active radiation for 0.01 to 120 s and preferably for 0.1 to 90 s.

Conditions of irradiating active radiation and a fundamental irradiation method are disclosed in JP-A No. 60-132767. Specifically, two light sources are placed on both sides of a head unit including an ink discharger, and the head unit and the light sources are scanned in a so-called shuttle mode. The active radiation is irradiated, after the deposition of the ink, within a constant time (for instance, 0.01 to 0.5 sec, preferably 0.01 to 0.3 sec and more preferably 0.01 to 0.15 sec). Thus, when a period from deposition of the ink to irradiation thereof is controlled to an extremely short period, it becomes possible to inhibit the deposited ink from bleeding before the deposited ink is cured. It also becomes possible to irradiate an ink composition before it penetrates into the depth of a porous recording medium, to which no light is penetrable, and thereby to inhibit the unreacted monomer from remaining, resulting in reducing the odor.

In addition, the ink composition may be cured completely by irradiation from another stationary light source. WO 99/54415 discloses, as an irradiation method, a method of using an optical fiber and a method of irradiating UV rays on a recording area by guiding a collimated light source to a mirror surface disposed on the sidewall of head unit. The irradiation methods may also be used in the invention.

When the inkjet recording method as mentioned above is adopted, even to various recording media of which surface wettability is different, a dot size of the deposited ink can be maintained constant and thereby image quality can be improved. In order to obtain a color image, it is preferable to superpose starting from a color that is lowest in the brightness. When ink is superposed in turn starting from one that is lowest in the brightness, illuminating rays become easy to reach lower ink; accordingly, excellent curing sensitivity, reduction of residual monomers, reduction of odor and an improvement in the adhesiveness can be expected. Furthermore, the irradiation can be performed in block after all colors are discharged. However, exposure for every color is preferable from a viewpoint of promotion of the curing.

Thus, the ink composition of the invention, when cured at high sensitivity due to irradiation of the active radiation, can form an image on a recording medium surface.

<Planographic Printing Plate and Producing Method Thereof>

When, by use of the ink-jet recording method of the invention, an ink composition of the invention is applied and cured on a hydrophilic support, a planographic printing plate can be produced.

In what follows, a producing process of a planographic printing plate, in which an inkjet recording process according to the invention is applied (a producing method of a planographic printing plate of the invention) and a planographic printing plate (a planographic printing plate according to the invention) obtained therewith will be described.

The planographic printing plate of the invention has a hydrophilic support and a hydrophobic image formed on the hydrophilic support. A producing process of the planographic printing plate includes steps below:

discharging an ink composition of the invention on a hydrophilic support ((a') process); and irradiating active radiation on the discharged ink composition to cure the ink composition to form a hydrophobic image obtained by curing the ink composition on the hydrophilic support((b') process).

That is, except that, as a recording medium, a support having a hydrophilic surface suitable for a planographic printing plate support is used, similarly to an inkjet recording method of the invention, a planographic printing plate can be produced.

So far, a planographic printing plate is produced, as mentioned above, in such a manner that a so-called PS plate having a constitution in which a lipophilic photosensitive resin layer is disposed on a hydrophilic support is exposed imagewise to solubilize or cure the exposed portion to form an image, followed by dissolving to remove a non-image portion.

On the other hand, in the planographic printing plate of the invention, by applying a producing method of a planographic printing plate of the invention (inkjet recording method according to the invention), in accordance with digitalized image information, an ink composition is directly discharged on a surface of a hydrophilic support, followed by curing, thereby a hydrophobic image portion is formed. Thus, easier more than ever, a planographic printing plate can be produced. [Hydrophilic Support used for Planographic Printing Plate]

The planographic printing plate of the invention has a hydrophilic support and a hydrophobic image formed from an ink composition of the invention on the hydrophilic support.

The support (recording medium) used in the planographic printing plate, on which an ink composition of the invention is discharged is not particularly restricted. All planar supports that have the dimensional stability can be used. However, when image quality of obtained printed matters is considered, a support having a hydrophilic surface is preferable.

A material that is used as a support, when it has the hydrophilicity, can be used as it is as a support. When the material does not have the hydrophilicity, the surface thereof may be rendered hydrophilic.

Examples of materials that can be used as the support include paper, plastic (such as polyethylene, polypropylene or polystyrene)-laminated papers, metal plates (such as aluminum, zinc and copper plates), plastic films (such as cellulose diacetate, cellulose triacetate, cellulose propionate, cellulose lactate, cellulose acetate lactate, cellulose nitrate, polyethylene terephthalate, polyethylene, polystyrene, polypropylene, polycarbonate and polyvinyl acetate films), and papers or plastic films on which above-mentioned metal is laminated or vapor-deposited. As the preferable support, a polyester film and an aluminum plate can be cited. Among these, since the aluminum plate is superior in terms of the dimensional stability and relatively inexpensive, the aluminum plate is preferable.

The aluminum plate is a pure aluminum plate, an alloy plate made of aluminum as a main component with a very small amount of extraneous elements or a plastic film on which a thin film of aluminum or aluminum alloy is laminated. Examples of extraneous elements contained in the aluminum alloy include silicon, iron, manganese, copper, magnesium, chromium, zinc, bismuth, nickel and titanium. The content by percentage of extraneous elements in the alloy is preferably 10 mass percent or less. In the invention, a pure aluminum plate is preferable. However, since completely pure aluminum is difficult to produce from the viewpoint of refining technology, a very small amount of extraneous elements may be contained in the plate. The aluminum plate is not specified in terms of the composition thereof. Thus, known aluminum plates can be appropriately used.

A thickness of the support is preferably in the range of 0.1 to 0.6 mm and more preferably in the range of 0.15 to 0.4 mm.

Prior to usage of the aluminum plate, surface treatment such as the surface-roughening treatment or the anodic oxidation treatment is preferably applied. Owing to the surface treatment, the hydrophilicity can be improved and the adhesiveness between the hydrophobic image and the support can be readily secured. Prior to subjecting the aluminum plate to the surface roughening process, the aluminum plate may be optionally subjected to degreasing treatment to remove rolling oil on the surface with a surfactant, an organic solvent and an aqueous alkaline solution.

The surface-roughening treatment of the aluminum plate surface can be performed by means of various processes such as a mechanical surface-roughening process, an electrochemical surface roughening process (surface roughening process where a surface is electrochemically dissolved) or a chemical surface roughening process (surface roughening process where a surface is chemically selectively dissolved).

As the mechanical surface roughening process, known methods such as a ball polishing process, a brush polishing process, a blast polishing process and a buff polishing process can be cited. Furthermore, a transfer process where in a rolling stage of aluminum a roll with an irregular surface is used to transfer an irregular pattern may be used.

As the electrochemical surface roughening process, a process of performing the surface roughening in an electrolyte solution containing acid such as hydrochloric acid or nitric acid by use of an alternating current or a direct current can be cited. Furthermore, as disclosed in JP-A No. 54-63902, a process where a mixed acid is used can be cited.

An aluminum plate whose surface is roughened is as needs arise subjected to alkali-etching treatment with an aqueous solution of potassium hydroxide or sodium hydroxide and neutralizing treatment, optionally followed by subjecting to the anodic oxidation to improve the wear resistance.

The electrolyte used in the anodic oxidation of the aluminum plate may be any of ones that can form a porous oxide film. In general, sulfuric acid, hydrochloric acid, oxalic acid, chromic acid or a mixed acid thereof can be used. The concentration of the electrolyte may be appropriately decided depending on the kind of electrolyte selected.

The conditions for anodic oxidation cannot be specified as a general rule since conditions vary depending on the electrolyte used. However, the following ranges of conditions are generally suitable: an electrolyte concentration of 1 to 80 mass percent in a solution, a solution temperature of 5 to 70° C., a current density of 5 to 60 A/dm$^2$, a voltage of 1 to 100 V, and an electrolyzing time of 10 s to 5 min. An amount of a formed anodic oxide film is preferably in the range of 1.0 to 5.0 g/m$^2$ and more preferably in the range of 1.5 to 4.0 g/m$^2$. In the range, excellent press life and scratch resistance of a non-image portion of the planographic printing plate can be preferably obtained.

As the support that is used in the invention, a substrate that is provided with such surface treatment and has an anodic oxidation film can be used as it is. However, in order to further improve the adhesiveness with the hydrophobic image, the hydrophilicity and the stain resistance, as needs arise, pore-widening treatment or pore sealing treatment of micropores of the anodic oxidation film, which is described in JP-A Nos. 2001-253181 and 2001-322365, or a treatment where the support is dipped in an aqueous solution containing a hydrophilic compound to render a surface hydrophilic can be appropriately selected and applied. It goes without saying that, in the pore-widening treatment and pore-sealing treatment, without restricting to the above processes, all so far known processes can be applied.

(Pore Sealing Process)

As the pore sealing process, in addition to a vapor sealing process, a single process with fluorozirconic acid, a pore sealing process with an aqueous solution containing an inorganic fluorine compound such as a process with sodium fluoride, a vapor sealing process with lithium chloride added and a pore sealing process with hot water can be applied.

Among these, a pore sealing process with an aqueous solution containing an inorganic fluorine compound, a pore sealing process with water vapor and a pore sealing process with hot water are preferable. These will be described respectively below.

—Pore Sealing Process with Aqueous Solution containing Inorganic Fluorine Compound—

As the inorganic fluorine compounds that can be used in the pore sealing process with an aqueous solution containing an inorganic fluorine compound, metal fluorides can be preferably cited.

Specific examples thereof include sodium fluoride, potassium fluoride, calcium fluoride, magnesium fluoride, sodium fluorozirconate, potassium fluorozirconate, sodium fluorotitanate, potassium fluorotitanate, ammonium fluorozirconate, ammonium fluorotitanate, potassium fluorotitanate, fluorozirconic acid, fluorotitanic acid, hexafluorosilicic acid, nickel fluoride, iron fluoride, fluorophosphoric acid and ammonium fluorophosphate. Among these, sodium fluorozirconate, sodium fluorotitanate, fluorozirconic acid and fluorotitanic acid are preferred.

The concentration of the inorganic fluorine compound in the aqueous solution is, in view of satisfactory sealing of micropores of the anodic oxide film, preferably 0.01 mass percent or more, more preferably 0.05 mass percent or more, and in view of the stain resistance, preferably 1 mass percent or less, and more preferably 0.5 mass percent or less.

The aqueous solution containing an inorganic fluorine compound preferably further contains a phosphate compound. When a phosphate compound is contained, since the hydrophilicity of a surface of the anodic oxide film is improved, the on-press developability and the stain resistance can be enhanced.

Suitable examples of the phosphate compounds include phosphates of metals such as alkali metals and alkaline earth metals.

Specific examples thereof include zinc phosphate, aluminum phosphate, ammonium phosphate, diammonium hydrogenphosphate, ammonium dihydrogenphosphate, mono-ammonium phosphate, mono-potassium phosphate, mono-sodium phosphate, potassium dihydrogenphosphate, dipotassium hydrogenphosphate, calcium phosphate, sodium ammonium hydrogenphosphate, magnesium hydrogenphosphate, magnesium phosphate, ferrous phosphate, ferric phosphate, sodium dihydrogenphosphate, sodium phosphate, disodium hydrogenphosphate, lead phosphate, diammonium phosphate, calcium dihydrogenphosphate, lithium phosphate, phosphotungstic acid, ammonium phosphotungstate, sodium phosphotungstate, ammonium phosphomolybdate, sodium phosphomolybdate, sodium phosphite, sodium tripolyphosphate and sodium pyrophosphate. Among these, sodium dihydrogenphosphate, disodium hydrogenphosphate, potassium dihydrogenphosphate and dipotassium hydrogenphosphate are preferred.

The combination of the inorganic fluorine compound and the phosphate compound is not particularly restricted. However, the aqueous solution preferably contains at least sodium fluorozirconate as the inorganic fluorine compound and at least sodium dihydrogenphosphate as the phosphate compound.

The concentration of the phosphate compound in the aqueous solution is, in view of enhancement of the on-press developability and the stain resistance, preferably 0.01 mass percent or more and more preferably 0.1 mass percent or more, and in view of the solubility, preferably 20 mass percent or less and more preferably 5 mass percent or less.

The ratio of the respective compounds in the aqueous solution is not particularly restricted. However, the mass ratio between the inorganic fluorine compound and the phosphate compound is preferably in the range of 1/200 to 10/1 and more preferably in the range of 1/30 to 2/1.

The temperature of the aqueous solution is preferably 20° C. or more, more preferably 40° C. or more, and preferably 100° C. or less and more preferably 80° C. or less.

The pH of the aqueous solution is preferably 1 or more, more preferably 2 or more, and preferably 11 or less, more preferably 5 or less.

The method for the pore-sealing process with an aqueous solution containing an inorganic fluorine compound is not particularly restricted. Examples thereof include a dipping process and a spray process. One of these processes may be used alone once or a plurality of times, or two or more thereof may be used in combination.

Among these, the dipping method is preferred. In the case of performing the process by using the dipping process, the processing time is preferably 1 s or more, more preferably 3 s or more, and preferably 100 s or less and more preferably 20 s or less.

—Pore Sealing Process with Water Vapor—

Examples of the methods of the pore-sealing process with water vapor include a method of continuously or discontinuously bringing water vapor into contact with the anodic oxide film under applied pressure or normal pressure.

The temperature of the water vapor is preferably 80° C. or more, more preferably 95° C. or more, and preferably 105° C. or less.

The pressure of the water vapor is preferably in the range of (atmospheric pressure−50 mmAq) to (atmospheric pressure+300 mmAq) (from $1.008 \times 10^5$ to $1.043 \times 10^5$ Pa).

Furthermore, the time period for which water vapor is contacted is preferably 1 s or more, more preferably 3 s or more, and preferably 100 s or less, more preferably 20 s or less.

—Pore Sealing Process with Hot Water—

Examples of the method of the pore-sealing treatment with hot water (water vapor) include a method of dipping an aluminum plate provided with an anodic oxide film thereon in hot water.

The hot water may contain an inorganic salt (for instance, phosphate) or an organic salt.

The temperature of the hot water is preferably 80° C. or more, more preferably 95° C. or more, and preferably 100° C. or less.

Furthermore, the time period for which the aluminum plate is dipped in hot water is preferably 1 s or more, more preferably 3 s or more, and preferably 100 s or less, more preferably 20 s or less.

As a process of rendering a support hydrophilic in the invention, there is an alkali metal silicate method such as described in U.S. Pat. Nos. 2,714,066, 3,181,461, 3,280,734 and 3,902,734. In the method, a support is dipped in an aqueous solution of sodium silicate or electrochemically processed. In addition to this, a method where potassium fluorozirconate is used, which is described in JP-B No. 36-22063 and a method where polyvinyl phosphonic acid is used, which is described in U.S. Pat. Nos. 3,276,868, 4,153,461 and 4,689,272 can be cited.

In the invention, the support preferably has the centerline average roughness in the range of 0.10 to 1.2 µm. When the centerline average roughness is in the range, excellent adhesiveness with a hydrophobic image, excellent press life and excellent stain resistance can be preferably obtained.

(a') Step of Discharging Ink Composition of the Invention on Hydrophilic Support In the beginning, an ink composition of the invention is discharged on a hydrophilic support. In the step, similarly to one described in the inkjet recording method, an existing known inkjet recording unit can be used. Furthermore, when ink is discharged with the inkjet recording unit, preferable ranges of temperature and viscosity of the ink and a control method thereof are similar as well.

(b') Step of Irradiating Active Radiation on Discharged Ink Composition to Cure the Ink Composition to Form Hydrophobic Image Obtained by Curing Ink Composition The ink composition discharged on a surface of the hydrophilic support, upon irradiation of the active radiation, is cured. The detail of the curing mechanism thereof is same as that described in the inkjet recording method. Furthermore, the active radiation sources that are used to cure the ink composition and preferable conditions thereof are same as that described in the inkjet recording method.

When the steps are undergone, a hydrophobic image obtained by curing the ink composition of the invention is formed on a surface of the hydrophilic support, and thereby a planographic printing plate is obtained.

Thus, when a planographic printing plate is produced by applying an inkjet recording process of the invention, even to various planographic printing plate supports different in the surface wettability, dot sizes of deposited ink can be maintained constant, resulting in forming a hydrophobic image with precision.

Furthermore, as mentioned above, the ink composition of the invention can be cured with high sensitivity to active radiation and form a hydrophobic region (hydrophobic image) excellent in the adhesiveness with the support and film quality.

From the above, a planographic printing plate of the invention is high in the image quality and excellent in the press life.

It goes without saying that the ink composition of the invention is useful not only for forming such an image portion of a planographic printing plate but also as an ink composition that is generally used.

EXAMPLES

The invention is specifically described below by referring to examples. However, the invention is not limited to these examples.

The following examples relate to the ink for UV inkjet of each color.

Unless otherwise specified, the term "parts" refers to "parts by mass."

Example 1-1

Components below were agitated by means of a high-speed water-cooling agitator, and thereby cyan UV inkjet ink was obtained.

step was measured. As a result, it was confirmed that an integrated exposure amount of UV rays on the sheet was substantially 330 mJ/cm$^2$. That is, the ink composition was confirmed cured at high sensitivity.

—Curability—

The curability was evaluated by touching a cured image portion of a printed matter obtained from the ink. As a result, it was confirmed that the tackiness after the curing was completely lost and the curability was excellent.

—Adhesiveness—

The adhesiveness with a recording medium was evaluated by means of the crosshatch test. As a result, such high adhesiveness as class 4B was shown.

The crosshatch test was carried out in accordance with ISO2409 (ASTM D 3359). That is, a cured film was crosscut into 25 cuts (6 cuts in both lengthwise and widthwise directions) at intervals of 2.0 mm, an adhesive tape (trade name: Scotch Tape (3M600), produced by Sumitomo 3M Corp.) was strongly affixed to the crosscut portions, followed by peeling off quickly the adhesive tape, and whether the cured film was peeled or not was investigated.

—Flexibility—

Furthermore, the flexibility was evaluated in such a manner that a sheet was folded 10 times and a degree of fissure generated on the cured film was observed. The folding test results were evaluated in terms of 5 grades (visual evaluation) with a state where there was no fissure ranked at 5 point and 3 point or more was evaluated as a state where there was no problem in practical application. As a result, the cured films, since only slight fissure that does not affect on the printed image was observed, were ranked as 3 point.

| (Cyan ink composition) | |
|---|---|
| (D) Specific polymer: D1-4 (weight-average molecular weight: 50,000) | 9.0 parts |
| (B) NK Ester A-NOD-N (* trade name, manufactured by Shin-Nakamura Chemical Co., Ltd., acrylate monomer) | 55.0 parts |
| (B) Photomer 2017 (trade name, manufactured by EChem Corp., UV diluting agent) | 14.4 parts |
| Solsperse 32000 (trade name, manufactured by Noveon Corp., dispersant) | 0.4 parts |
| (C) Irgalite Blue GLVO (trade name, manufactured by Ciba Specialty Chemicals Corp., pigment) | 3.6 parts |
| Genorad 16 (trade name, manufactured by Rahn Corp., stabilizer) | 0.05 parts |
| (A): Lucirin TPO (trade name, produced by BASF Corp., photo-polymerization initiator) | 8.5 parts |
| (A): Benzophenone (photo-polymerization initiator) | 4.0 parts |
| (A): Irgacure 184 (trade name, manufactured by Ciba Specialty Chemicals Corp., photo-polymerization initiator,) | 4.0 parts |
| (A): 2,4-diethyl thioxanthone | 1.0 parts |
| Byk 307 ((trade name, manufactured by BYK Chemie, defoaming agent) | 0.05 parts |

Here, * NK Ester A-NOD-N is 1,9-nonanediol diacrylate (bifunctional acrylate).

(Evaluation of Ink)

The obtained cyan ink composition was printed on a polyvinyl chloride sheet, followed by allowing passing at a speed of 20 m/min under illumination of light from an iron-doped UV-lamp (power 60 W/cm$^2$) to irradiate to cure, and thereby a printed material was obtained.

At this time, evaluations below were carried out.

—Sensitivity—

With an integrating actiometer UV PowerMAP (trade name, produced by EIT Inc.), exposure energy in the curing Results are shown in Table 1 below.

Example 1-2

Components below were agitated by means of a high-speed water-cooling agitator, and thereby magenta UV inkjet ink was obtained.

| (Magenta ink composition) | |
|---|---:|
| (D) Specific polymer: D1-1 (weight-average molecular weight: 10,000) | 3.0 parts |
| (B) NK Ester A-NOD-N (trade name, trade name, manufactured by Shin-Nakamura Chemical Co., Ltd., acrylate monomer) | 35.0 parts |
| (B) Actilane 422 (* trade name, manufactured by Akcros Corp., acrylate monomer) | 21.4 parts |
| (B) Photomer 2017 (trade name, manufactured by EChem Corp., UV diluting agent) | 16.0 parts |
| Solsperse 32000 (trade name, manufactured by Noveon Corp., dispersant) | 0.4 parts |
| (C) Cinquasia Mazenta RT-355D (trade name, manufactured by Ciba Specialty Chemicals Corp., pigment) | 3.6 parts |
| Genorad 16 (trade name, manufactured by Rahn Corp., stabilizer) | 0.05 parts |
| (B) Rapi-Cure DVE-3 (trade name, manufactured by ISP Europe Corp., vinyl ether,) | 3.0 parts |
| (A): Lucirin TPO (photo-polymerization initiator, trade name, manufactured by BASF Corp.) | 8.5 parts |
| (A): Benzophenone (photo-polymerization initiator) | 4.0 parts |
| (A): Irgacure 184 (trade name, manufactured by Ciba Specialty Chemicals Corp., photo-polymerization initiator) | 4.0 parts |
| Byk 307 (trade name, manufactured by BYK Chemie, defoaming agent) | 0.05 parts |

Here, * Actilane 422 is dipropylene glycol diacrylate (bifunctional acrylate).

The obtained magenta ink composition was printed on a polyvinyl chloride sheet, followed by allowing passing at a speed of 20 m/min under illumination of light from an iron-doped UV-lamp (power 60 W/cm$^2$) to irradiate. A printed material obtained with the ink was evaluated similarly to Example 1-1. Results are shown in Table 1 below.

Example 1-3

Components below were agitated by means of a high-speed water-cooling agitator, and thereby yellow UV inkjet ink was obtained.

| (Yellow ink composition) | |
|---|---:|
| (D) Specific polymer: D1-5 (weight-average molecular weight: 8,000) | 18.0 parts |
| (B) NK Ester A-NOD-N (trade name, manufactured by Shin-Nakamura Chemical Co., Ltd., acrylate monomer) | 41.4 parts |
| (B) Photomer 2017 (trade name, manufactured by EChem Corp., UV diluting agent) | 18.0 parts |
| Solsperse 32000 (trade name, manufactured by Noveon Corp. dispersant) | 0.4 parts |
| (C) Cromophtal Yellow LA (trade name, manufactured by Ciba Specialty Chemicals Corp., pigment) | 3.6 parts |
| Genorad 16 (trade name, manufactured by Rahn Corp., stabilizer) | 0.05 parts |
| (B) Rapi-Cure DVE-3 (trade name, manufactured by ISP Europe Corp., vinyl ether) | 2.0 parts |
| (A): Lucirin TPO (trade name, manufactured by BASF Corp., photo-polymerization initiator) | 8.5 parts |
| (A): Benzophenone (photo-polymerization initiator) | 4.0 parts |
| (A): Irgacure 184 (trade name, manufactured by Ciba Specialty Chemicals Corp., photo-polymerization initiator) | 4.0 parts |
| Byk 307 (trade name, manufactured by BYK Chemie, defoaming agent) | 0.05 parts |

The obtained yellow ink composition was printed on a polyvinyl chloride sheet, followed by allowing passing at a speed of 20 m/min under illumination of light from an iron-doped UV-lamp (power 60 W/cm$^2$) to irradiate. A printed material obtained with the ink was evaluated similarly to Example 1-1. Results are shown in Table 1 below.

Example 1-4

Components below were agitated by means of a high-speed water-cooling agitator, and thereby black UV inkjet ink was obtained.

| (Black ink composition) | |
|---|---|
| (D) Specific polymer: D1-4 (weight-average molecular weight: 22,000) | 12.0 parts |
| (B) NK Ester A-NOD-N (trade name, manufactured by Shin-Nakamura Chemical Co., Ltd., acrylate monomer) | 50.4 parts |
| (B) Photomer 2017 (trade name, manufactured by EChem Corp., UV diluting agent) | 16.0 parts |
| Solsperse 32000 (trade name, manufactured by Noveon Corp., dispersant) | 0.4 parts |
| (C) Microlith Black C-K (trade name, manufactured by Ciba Specialty Chemicals Corp., pigment) | 2.6 parts |
| Genorad 16 (stabilizer, trade name, manufactured by Rahn Corp.) | 0.05 parts |
| (B) Rapi-Cure DVE-3 (trade name, manufactured by ISP Europe Corp., vinyl ether) | 2.0 parts |
| (A): Lucirin TPO (trade name, manufactured by BASF Corp., photo-polymerization initiator) | 8.5 parts |
| (A): Benzophenone (photo-polymerization initiator) | 4.0 parts |
| (A): Irgacure 184 (trade name, manufactured by Ciba Specialty Chemicals Corp., photo-polymerization initiator) | 4.0 parts |
| Byk 307 (trade name, manufactured by BYK Chemie, defoaming agent) | 0.05 parts |

The obtained black ink composition was printed on a polyvinyl chloride sheet, followed by allowing passing at a speed of 20 m/min under illumination of light from an iron-doped UV-lamp (power 60 W/cm$^2$) to irradiate. A printed material obtained with the ink was evaluated similarly to Example 1-1. Results are shown in Table 1 below.

Example 1-5

Components below were agitated by means of a high-speed water-cooling agitator, and thereby cyan UV inkjet ink was obtained.

| (Cyan ink composition) | |
|---|---|
| (D) Specific polymer: D1-3 (weight-average molecular weight: 7,000) | 4.0 parts |
| (B) Actilane 422 (trade name, manufactured by Akcros Corp., acrylate monomer) | 75.4 parts |
| Solsperse 32000 (trade name, manufactured by Noveon Corp., dispersant) | 0.4 parts |
| (C) Irgalite Blue GLVO (trade name, manufactured by Ciba Specialty Chemicals Corp., pigment) | 3.6 parts |
| Genorad 16 (trade name, manufactured by Rahn Corp., stabilizer) | 0.05 parts |
| (B) Rapi-Cure DVE-2 (trade name, manufactured by ISP Europe Corp., vinyl ether) | 2.0 parts |
| (A): Lucirin TPO (ptrade name, manufactured by BASF Corp., hoto-polymerization initiator) | 8.5 parts |
| (A): Benzophenone (photo-polymerization initiator) | 4.0 parts |
| (A): Irgacure 184 (trade name, manufactured by Ciba Specialty Chemicals Corp., photo-polymerization initiator) | 4.0 parts |
| Byk 307 (trade name, manufactured by BYK Chemie, defoaming agent) | 0.05 parts |

The obtained cyan ink composition was printed on a polyvinyl chloride sheet, followed by allowing passing at a speed of 20 m/min under illumination of light from an iron-doped UV-lamp (power 60 W/cm$^2$) to irradiate. A printed material obtained with the ink was evaluated similarly to Example 1-1. Results are shown in Table 1 below.

Comparative Example 1-1

Components below were agitated by means of a high-speed water-cooling agitator, and thereby cyan UV inkjet ink was obtained.

| (Cyan ink composition) | |
| --- | --- |
| (B) NK Ester A-NOD-N (*: trade name, manufactured by Shin-Nakamura Chemical Co., Ltd., acrylate monomer) | 64.0 parts |
| (B) Photomer 2017 (trade name, manufactured by EChem Corp., UV diluting agent) | 14.4 parts |
| Solsperse 32000 (trade name, manufactured by Noveon Corp., dispersant) | 0.4 parts |
| (C) Irgalite Blue GLVO (trade name, manufactured by Ciba Specialty Chemicals Corp., pigment) | 3.6 parts |
| Genorad 16 (trade name, manufactured by Rahn Corp., stabilizer) | 0.05 parts |
| (A): Lucirin TPO (trade name, manufactured by BASF Corp., photo-polymerization initiator) | 8.5 parts |
| (A): Benzophenone (photo-polymerization initiator) | 4.0 parts |
| (A): Irgacure 184 (trade name, manufactured by Ciba Specialty Chemicals Corp., photo-polymerization initiator) | 4.0 parts |
| (A): 2,4-diethylene thioxanthone | 1.0 parts |
| Byk 307 (trade name, manufactured by BYK Chemie, defoaming agent) | 0.05 parts |

The obtained cyan ink composition was printed on a polyvinyl chloride sheet, followed by allowing passing at a speed of 20 m/min under illumination of light from an iron-doped UV-lamp (power 60 W/cm$^2$) to irradiate. A printed material obtained with the ink was evaluated similarly to Example 1-1. Results are shown in Table 1 below.

TABLE 1

| | Evaluation | | | |
| --- | --- | --- | --- | --- |
| | Exposure Amount (mJ/cm$^2$) | Curability | Adhesiveness | Flexibility |
| Example 1-1 | 330 | Excellent | 4B | 3 |
| Example 1-2 | 330 | Excellent | 4B | 3 |
| Example 1-3 | 330 | Excellent | 3B | 3 |
| Example 1-4 | 330 | Excellent | 3B | 3 |
| Example 1-5 | 330 | Excellent | 4B | 4 |
| Comparative Example 1-1 | 330 | Poor | — | — |

* The folding test results were evaluated in terms of 5 grades (visual evaluation) with a state where there was no fissure ranked at 5 point.

As is clear from Table 1, all ink compositions according to Examples 1-1 through 1-5 were cured at high sensitivity and excellent in terms of each of curability of an image portion, adhesiveness to a recording medium and flexibility of an image (film).

On the other hand, the ink composition of Comparative Example 1-1 that does not contain the specific polymer (D1) was inferior in curability, and adhesiveness and flexibility could not be evaluated.

Example 1-6

<Preparation of Support>

With an aluminum alloy containing 0.06 mass percent Si, 0.30 mass percent Fe, 0.025 mass percent Cu, 0.001 mass percent Mn, 0.001 mass percent Mg, 0.001 mass percent Zn, 0.03 mass percent Ti and a balance of Al and unavoidable impurities, molten metal was prepared, followed by applying a molten metal treatment and filtration, further followed by preparing an ingot of a thickness of 500 mm and a width of 1,200 mm by means of a DC casting method. A surface thereof was scalped by substantially 10 mm by average with a surface scalping machine, followed by soaking at 550° C. for substantially 5 hr, after a temperature came down to 400° C., further followed by rolling to a rolled plate having a thickness of 2.7 mm by means of a hot rolling mill. Furthermore, a continuous annealing machine was used to process at 500° C., followed by finishing to a thickness of 0.24 mm by applying cold rolling, and thereby an aluminum plate of JIS 1050 material was obtained. A minor diameter of average grain diameter of the obtained aluminum plate was 50 μm and a major diameter thereof was 300 μm. The aluminum plate was cut to a width of 1,030 mm, followed by applying a surface treatment shown below, and thereby an aluminum support was obtained.

<Surface Treatment>

In the surface treatment, various kinds of treatments (a) through (j) below were continuously applied. After each treatment and water washing, a nip roller was used to drain water.

(a) Mechanical Surface Roughening Treatment

With a suspension liquid containing a polishing agent having the specific gravity of 1.12 (Pumice) and water feeding as a polishing slurry solution on a surface of an aluminum plate, a rotating roller-like shaped nylon brush was used to apply the mechanical surface roughening. An average grain size of the polishing agent was 30 μm and the maximum grain size was 100 μm. The nylon brush was made of 6-10 nylon and had a hair length of 45 mm and a hair diameter of 0.3 mm. The nylon brush had hairs densely planted in holes in a stainless cylinder of φ300 mm. Three rotating brushes were used. A distance between two support rollers (φ200 mm) at a lower portion of the brush was 300 mm. A brush roller was pressed against the aluminum plate so that the load of a driving motor that rotates the brush was increased by 7 kW relative to the load that was applied before the brush roller was pressed against an aluminum plate. A direction of rotation of the brush was same as that in which the aluminum plate moves. The number of rotations of the brush was 200 rpm.

(b) Alkali Etching Treatment

The above-obtained aluminum plate was etched by spraying an aqueous solution of a sodium hydroxide concentration of 2.6 mass percent and an aluminum ion concentration of 6.5 mass percent at 70° C. to dissolve the aluminum plate by 10 g/m$^2$. Thereafter, water washing was applied by spraying.

(c) Desmut Treatment

Desmut treatment was carried out with an aqueous solution of 1 mass percent nitric acid (containing 0.5 mass percent aluminum ions) kept at 30° C. by spraying, followed by water washing by spraying. As the aqueous nitric acid solution used in the desmut treatment, a waste solution obtained in a step where the electrochemical surface roughing treatment was applied using AC in an aqueous nitric acid solution was used.

(d) Electrochemical Surface Roughing Treatment

Electrochemical surface roughing treatment was continuously carried out using an AC voltage of 60 Hz. The electrolytic solution used at this time was an aqueous solution containing 10.5 g/L of nitric acid (including 5 g/L of aluminum ions and 0.007 mass percent of ammonium ion) and the temperature of this electrolytic solution was 50° C. With, as an AC power source waveform, a trapezoidal rectangular wave AC where a time required for a current value to reach a peak from 0 was 0.8 m sec and the duty ratio was 1:1, and with a carbon electrode as a counter electrode, electrochemical surface roughing treatment was carried out. As the auxiliary anode, ferrite was used.

The current density was 30 A/dm$^2$ as a peak current value and an amount of electricity was 220 C/dm$^2$ in total of an amount of electricity when the aluminum plate was an anode. At this time, 5% of the current flowing from the power source was supplied separately to the auxiliary electrode.

Thereafter, the aluminum plate was water washed by spraying.

(e) Alkali Etching Treatment

The aluminum plate was subjected to etching treatment carried out at 32° C. with an aqueous solution containing 26 mass percent sodium hydroxide and 6.5 mass percent aluminum ions by spraying to etch. Thereby, the aluminum plate was etched by an amount of 0.50 g/m$^2$ to remove the smut component primarily containing aluminum hydroxide generated when the preceding electrochemical surface roughing treatment was carried out using AC and also to etch the edge part of the pit produced thereby to smooth the edge part. Then, the aluminum plate was water washed by spraying.

(f) Desmut Treatment

An aqueous solution of 15 mass percent nitric acid (containing 4.5 mass percent aluminum ions) was used to carry out the desmut treatment at 30° C. by spraying, followed by washing with water by spraying. As the aqueous nitric acid solution used in the desmut treatment, a waste solution in a step of carrying out electrochemical surface roughing treatment with AC in an aqueous nitric acid solution was used.

(g) Electrochemical Surface Roughing Treatment

The electrochemical surface roughing treatment was continuously carried out with an AC voltage of 60 Hz. The electrolytic solution used at this time was an aqueous solution containing 5.0 g/L of hydrochloric acid (including 5 g/L of aluminum ions) and the temperature of this electrolytic solution was 35° C. The AC power source waveform had a trapezoidal rectangular AC where a time required for current value to reach a peak from 0 was 0.8 m sec and the duty ratio was 1:1. The electrochemical surface roughing treatment was carried out with a carbon electrode as a counter electrode. As the auxiliary anode, ferrite was used.

The current density was 25 A/dm$^2$ as a peak current value and an amount of electricity was 50 C/dm$^2$ as a total amount of electricity when the aluminum plate was an anode. Then the aluminum plate was water washed by spraying.

(h) Alkali Etching Treatment

The aluminum plate was subjected to etching treatment carried out at 32° C. with an aqueous solution containing 26 mass percent sodium hydroxide and 6.5 mass percent aluminum ions by spraying to etch. The aluminum plate was etched by an amount of 0.12 g/m$^2$ to remove the smut component primarily containing aluminum hydroxide generated when the foregoing electrochemical surface roughing treatment was applied with the AC in the preceding step and also to etch the edged part of the pit produced to thereby round the edged part. Then, the aluminum plate was water washed by spraying.

(i) Desmut Treatment

An aqueous solution of 25 mass percent sulfuric acid (including 0.5 mass percent of aluminum ions) was used to carry out the desmut treatment at 60° C. by spraying, followed by water washing by spraying.

(j) Anodic Oxidation Treatment

With an anodic oxidation unit (respective lengths of first and second electrolysis portions: 6 m, respective lengths of first and second power feeding parts: 3 m and respective lengths of first and second power feeding parts: 2.4 m), the anodic oxidation treatment was carried out. As electrolytic solutions supplied to the first and second electrolysis portions, sulfuric acid was used. Both electrolytic solutions had a sulfuric acid concentration of 50 g/L (containing 0.5 mass percent aluminum ion) at 20° C. Thereafter, water washing was applied by spraying. A final oxide film amount was 2.7 g/m$^2$.

(Preparation and Evaluation of Planographic Printing Plate)

On the above-prepared aluminum support, the ink composition of Example 1-5 was printed, and, similarly to Example 1-5, an image was formed and cured.

With this as a planographic printing plate, according to methods below, an image and a printing durability were evaluated.

a. Evaluation of Image

A planographic printing plate prepared with the ink composition of Example 1-6 was mounted on a Heidel KOR-D unit, and ink [VALUES-G Red produced by Dainippon Ink Co. Ltd. for sheet-fed press] and wetting water [Ecolity 2 produced by Fuji Photo Film Co. Ltd.] were supplied to carry out printing. The printed matter after 100 sheets were printed was evaluated by visual observation. As a result, no missing part in the image portion was found and no stain was found in the non-image portion, that is, it was confirmed to be an excellent image.

b. Evaluation of Printing Durability

When the printing was continued as it was, 5,000 sheets or more of high image quality printed matters where no missing part in the image portion and no stain in the non-image portion was found were obtained and the printing durability as well was confirmed to be practically no problem.

Example 2-1

Components below were agitated by means of a high-speed water-cooling agitator, and thereby cyan UV inkjet ink was obtained.

| (Cyan color ink composition) | |
|---|---|
| (D2): D2-4 (n is 8 in average) | 13.0 parts |
| (B): NK Ester A-NOD-N (* trade name, manufactured by Shin-Nakamura Chemical Co., Ltd., acrylate monomer) | 52.0 parts |
| Photomer 2017 (trade name, manufactured by EChem Corp., UV diluting agent) | 14.4 parts |

-continued

| (Cyan color ink composition) | |
|---|---|
| Solsperse 32000 (trade name, manufactured by Noveon Corp., dispersant) | 0.4 parts |
| (C): Irgalite Blue GLVO (trade name, manufactured by Ciba Specialty Chemicals Corp., pigment) | 3.6 parts |
| (A): Genorad 16 (trade name, manufactured by Rahn Corp., stabilizer) | 0.05 parts |
| (A): Lucirin TPO (trade name, manufactured by BASF Corp., photo-polymerization initiator) | 8.5 parts |
| (A): Benzophenone (photo-polymerization initiator) | 4.0 parts |
| (A): Irgacure 184 (trade name, manufactured by Ciba Specialty Chemicals Corp., photo-polymerization initiator) | 4.0 parts |
| Byk 307 (trade name, manufactured by BYK Chemie, defoaming agent) | 0.05 parts |

Here, * NK Ester A-NOD-N is 1,9-nonanediol diacrylate (bifunctional acrylate).

(Evaluation of Ink)

The obtained cyan ink composition was printed on a polyvinyl chloride sheet, followed by allowing passing at a speed of 40 m/min under illumination of light from an iron-doped UV-lamp (power 120 W/cm$^2$) to irradiate to cure, and thereby a printed material was obtained.

At this time, evaluations below were carried out.

—Sensitivity—

With an integrating actiometer UV PowerMAP (trade name, produced by EIT Inc.), exposure energy in the curing step was measured. As a result, it was confirmed that an integrated exposure amount of UV rays on the sheet was substantially 330 mJ/cm$^2$. That is, the ink composition was confirmed cured at high sensitivity.

—Curability—

The curability was evaluated by touching a cured image portion of a printed matter obtained from the ink. As a result, it was confirmed that the tackiness after the curing was completely lost and the curability was excellent.

—Adhesiveness—

The adhesiveness with a recording medium was evaluated by means of the crosshatch test. As a result, such high adhesiveness as class 4B (ASTM) was shown.

The crosshatch test was carried out in accordance with ISO2409 (ASTM D 3359). That is, a cured film was crosscut into 25 cuts (6 cuts in both lengthwise and widthwise directions) at intervals of 2.0 mm, an adhesive tape (trade name: Scotch Tape (3M600), produced by Sumitomo 3M Corp.) was strongly affixed to the crosscut portions, followed by peeling off quickly the adhesive tape, and whether the cured film was peeled or not was investigated.

—Flexibility—

Furthermore, the flexibility was evaluated in such a manner that a sheet was folded 10 times and a degree of fissure generated on the cured film was observed. The folding test results were evaluated in terms of 5 grades (visual evaluation) with a state where there was no fissure ranked at 5 point and 3 point or more was evaluated as a state where there was no problem in practical application. As a result, the cured films, since only slight fissure that does not affect on the printed image was observed, were ranked as 4 point.

Results are shown in Table 2.

Example 2-2

Components below were agitated by means of a high-speed water-cooling agitator, and thereby magenta UV inkjet ink was obtained.

| (Magenta ink composition) | |
|---|---|
| (D2): D2-3 (n is 13 by average) | 4.0 parts |
| (B): NK Ester A-NOD-N (trade name, manufactured by Shin-Nakamura Chemical Co., Ltd., acrylate monomer) | 55.4 parts |
| Photomer 2017 (trade name, manufactured by EChem Corp., UV diluting agent) | 16.0 parts |
| Solsperse 32000 (trade name, manufactured by Noveon Corp., dispersant) | 0.4 parts |
| (C): Cinquasia Mazenta RT-355D (trade name, manufactured by Ciba Specialty Chemicals Corp., pigment) | 3.6 parts |
| Genorad 16 (trade name, manufactured by Rahn Corp., stabilizer) | 0.05 parts |
| (B): Rapi-Cure DVE-3 (trade name, manufactured by ISP Europe Corp., vinyl ether) | 3.0 parts |
| (A): Lucirin TPO (trade name, manufactured by BASF Corp., photo-polymerization initiator) | 8.5 parts |
| (A): Benzophenone (photo-polymerization initiator) | 4.0 parts |
| (A): Irgacure 184 (trade name, manufactured by Ciba Specialty Chemicals Corp., photo-polymerization initiator) | 4.0 parts |
| Byk 307 (trade name, manufactured by BYK Chemie, defoaming agent,) | 0.05 parts |

The obtained magenta ink composition was printed on a polyvinyl chloride sheet, followed by allowing passing at a speed of 20 m/min under illumination of light from an iron-doped UV-lamp (power 60 W/cm$^2$) to irradiate. A printed material obtained with the ink was evaluated similarly to Example 2-1. Results are shown in Table 2 below.

Example 2-3

Components below were agitated by means of a high-speed water-cooling agitator, and thereby yellow UV inkjet ink was obtained.

| (Yellow ink composition) | |
|---|---|
| (D2): D2-21 (n is 6 by average) | 18.0 parts |
| (B): NK Ester A-NOD-N (trade name, manufactured by Shin-Nakamura Chemical Co., Ltd., acrylate monomer) | 42.4 parts |
| Photomer 2017 (trade name, manufactured by EChem Corp., UV diluting agent) | 17.0 parts |
| Solsperse 32000 (trade name, manufactured by Noveon Corp., dispersant) | 0.4 parts |
| (C): Cromophtal Yellow LA (trade name, manufactured by Ciba Specialty Chemicals Corp., pigment) | 3.6 parts |
| Genorad 16 (trade name, manufactured by Rahn Corp., stabilizer) | 0.05 parts |
| (B): Rapi-Cure DVE-3 (trade name, manufactured by ISP Europe Corp., vinyl ether) | 2.0 parts |
| (A): Lucirin TPO (trade name, manufactured by BASF Corp., photo-polymerization initiator) | 8.5 parts |
| (A): Benzophenone (photo-polymerization initiator), | 4.0 parts |
| (A): Irgacure 184 (trade name, manufactured by Ciba Specialty Chemicals Corp., photo-polymerization initiator) | 4.0 parts |
| Byk 307 (trade name, manufactured by BYK Chemie, defoaming agent) | 0.05 parts |

The obtained yellow ink composition was printed on a polyvinyl chloride sheet, followed by allowing passing at a speed of 20 m/min under illumination of light from an iron-doped UV-lamp (power 60 W/cm$^2$) to irradiate. A printed material obtained with the ink was evaluated similarly to Example 2-1. Results are shown in Table 2 below.

Example 2-4

Components below were agitated by means of a high-speed water-cooling agitator, and thereby black UV inkjet ink was obtained.

| (Black ink composition) | |
|---|---|
| (D2): D2-22 (n is 6 by average) | 9.0 parts |
| (B): NK Ester A-NOD-N (trade name, manufactured by Shin-Nakamura Chemical Co., Ltd., acrylate monomer) | 53.4 parts |
| Photomer 2017 (trade name, manufactured by EChem Corp., UV diluting agent) | 16.0 parts |
| Solsperse 32000 (trade name, manufactured by Noveon Corp., dispersant) | 0.4 parts |
| (C): Microlith Black C-K (trade name, manufactured by Ciba Specialty Chemicals Corp., pigment) | 2.6 parts |
| Genorad 16 (trade name, manufactured by Rahn Corp., stabilizer) | 0.05 parts |
| (B): Rapi-Cure DVE-3 (trade name, manufactured by ISP Europe Corp., vinyl ether) | 2.0 parts |
| (A): Lucirin TPO (trade name, manufactured by BASF Corp., photo-polymerization initiator) | 8.5 parts |
| (A): Benzophenone (photo-polymerization initiator) | 4.0 parts |
| (A): Irgacure 184 (trade name, manufactured by Ciba Specialty Chemicals Corp., photo-polymerization initiator,) | 4.0 parts |
| Byk 307 (trade name, manufactured by BYK Chemie, defoaming agent) | 0.05 parts |

The obtained balck ink composition was printed on a polyvinyl chloride sheet, followed by allowing passing at a speed of 20 m/min under illumination of light from an iron-doped UV-lamp (power 60 W/cm$^2$) to irradiate. A printed material obtained with the ink was evaluated similarly to Example 2-1. Results are shown in Table 2 below.

Example 2-5

Components below were agitated by means of a high-speed water-cooling agitator, and thereby cyan UV inkjet ink was obtained.

| (Cyan ink composition) | |
|---|---|
| (D2): D2-24 (n is 9 by average) | 10.0 parts |
| (B): NK Ester A-NOD-N (trade name, manufactured by Shin-Nakamura Chemical Co., Ltd., acrylate monomer) | 69.4 parts |
| Solsperse 32000 (trade name, manufactured by Noveon Corp., dispersant) | 0.4 parts |
| (C): Irgalite Blue GLVO (trade name, manufactured by Ciba Specialty Chemicals Corp., pigment) | 3.6 parts |
| Genorad 16 (trade name, manufactured by Rahn Corp., stabilizer) | 0.05 parts |
| (B): Rapi-Cure DVE-2 (trade name, manufactured by ISP Europe Corp., vinyl ether) | 2.0 parts |
| (A): Lucirin TPO (trade name, manufactured by BASF Corp., photo-polymerization initiator) | 8.5 parts |
| (A): Benzophenone (photo-polymerization initiator) | 4.0 parts |
| (A): Irgacure 184 (trade name, manufactured by Ciba Specialty Chemicals Corp., photo-polymerization initiator) | 4.0 parts |
| Byk 307 (trade name, manufactured by BYK Chemie, defoaming agent) | 0.05 parts |

The obtained cyan ink composition was printed on a polyvinyl chloride sheet, followed by allowing passing at a speed of 20 m/min under illumination of light from an iron-doped UV-lamp (power 60 W/cm$^2$) to irradiate. A printed material obtained with the ink was evaluated similarly to Example 2-1. Results are shown in Table 2 below.

Example 2-6

Components below were agitated by means of a high-speed water-cooling agitator, and thereby cyan UV inkjet ink was obtained.

| (Cyan color ink composition) | |
|---|---|
| (D2): D2-4 (n is 9 by average) | 6.0 parts |
| (D2): D2-21 (n is 9 by average) | 7.0 parts |
| (B): KAYARAD HDDA (* trade name, manufactured by Nippon Kayaku Co., Ltd., acrylate monomer) | 26.6 parts |
| (B): NK Ester A-NOD-N (trade name, manufactured by Shin-Nakamura Chemical Co., Ltd., acrylate monomer) | 45.0 parts |
| Solsperse 32000 (trade name, manufactured by Noveon Corp., dispersant) | 0.4 parts |
| Solsperse 5000 (trade name, manufactured by Noveon Corp., dispersant) | 0.05 parts |
| (C): Irgalite Blue GLVO trade name, manufactured by Ciba Specialty Chemicals Corp., (pigment) | 1.4 parts |
| Genorad 16 (trade name, manufactured by Rahn Corp., stabilizer) | 0.05 parts |
| (B): Rapi-Cure DVE-3 (trade name, manufactured by ISP Europe Corp., vinyl ether) | 1.0 parts |
| (A): Lucirin TPO (trade name, manufactured by BASF Corp., photo-polymerization initiator) | 8.0 parts |
| (A): Benzophenone (photo-polymerization initiator) | 2.0 parts |
| (A): Irgacure 184 (trade name, manufactured by Ciba Specialty Chemicals Corp., photo-polymerization initiator) | 4.0 parts |
| (A) 2,4-diethyl thioxanthone | 2.0 parts |
| Byk 307 (defoaming agent, trade name, manufactured by BYK Chemie), | 0.5 parts |

Here, * KAYARAD HDDA is 1,6-hexane diol diacrylate (bifunctional acrylate).

The obtained cyan ink composition was printed on a polyvinyl chloride sheet, followed by allowing passing at a speed of 20 m/min under illumination of light from an iron-doped UV-lamp (power 60 W/cm$^2$) to irradiate. A printed material obtained with the ink was evaluated similarly to Example 2-1. Results are shown in Table 2 below.

Comparative Example 2-1

Components below were agitated by means of a high-speed water-cooling agitator, and thereby cyan UV inkjet ink was obtained.

| (Cyan ink composition) | |
|---|---|
| (B): NK Ester A-NOD-N (trade name, manufactured by Shin-Nakamura Chemical Co., Ltd., acrylate monomer) | 65.0 parts |
| Photomer 2017 (trade name, manufactured by EChem Corp., UV diluting agent) | 14.4 parts |
| Solsperse 32000 (trade name, manufactured by Noveon Corp., dispersant) | 0.4 parts |
| (C): Irgalite Blue GLVO (trade name, manufactured by Ciba Specialty Chemicals Corp., pigment) | 3.6 parts |
| Genorad 16 (trade name, manufactured by Rahn Corp., stabilizer) | 0.05 parts |
| (A): Lucirin TPO trade name, manufactured by BASF Corp., (photo-polymerization initiator) | 8.5 parts |
| (A): Benzophenone (photo-polymerization initiator) | 4.0 parts |
| (A): Irgacure 184 (trade name, manufactured by Ciba Specialty Chemicals Corp., photo-polymerization initiator) | 4.0 parts |
| Byk 307 (trade name, manufactured by BYK Chemie, defoaming agent) | 0.05 parts |

The obtained cyan ink composition was printed on a polyvinyl chloride sheet, followed by allowing passing at a speed of 20 m/min under illumination of light from an iron-doped UV-lamp (power 60 W/cm$^2$) to irradiate. A printed material obtained with the ink was evaluated similarly to Example 2-1. Results are shown in Table 2 below.

Comparative Example 2-2

Components below were agitated by means of a high-speed water-cooling agitator, and thereby cyan UV inkjet ink was obtained.

| (Cyan color ink composition) | |
|---|---|
| (D2): D2-4 (n is 8 by average) | 25.0 parts |
| (B): NK Ester A-NOD-N (trade name, manufactured by Shin-Nakamura Chemical Co., Ltd., acrylate monomer) | 40.0 parts |
| Photomer 2017 (trade name, manufactured by EChem Corp., UV diluting agent) | 14.4 parts |
| Solsperse 32000 (trade name, manufactured by Noveon Corp., dispersant) | 0.4 parts |
| (C): Irgalite Blue GLVO (trade name, manufactured by Ciba Specialty Chemicals Corp., pigment) | 3.6 parts |
| Genorad 16 (trade name, manufactured by Rahn Corp., stabilizer) | 0.05 parts |
| (A): Lucirin TPO (trade name, manufactured by BASF Corp., photo-polymerization initiator) | 8.5 parts |
| (A): Benzophenone (photo-polymerization initiator) | 4.0 parts |
| (A): Irgacure 184 (trade name, manufactured by Ciba Specialty Chemicals Corp., photo-polymerization initiator) | 4.0 parts |
| Byk 307 (trade name, manufactured by BYK Chemie, defoaming agent) | 0.05 parts |

The obtained cyan ink composition was printed on a polyvinyl chloride sheet, followed by allowing passing at a speed of 20 m/min under illumination of light from an iron-doped UV-lamp (power 60 W/cm$^2$) to irradiate. A printed material obtained with the ink was evaluated similarly to Example 2-1. Results are shown in Table 2 below.

Comparative Example 2-3

Components below were agitated by means of a high-speed water-cooling agitator, and thereby cyan UV inkjet ink was obtained.

| (Cyan ink composition) | |
| --- | --- |
| (D2): D2-4 (n is 8 by average) | 1.0 parts |
| (B): NK Ester A-NOD-N (trade name, manufactured by Shin-Nakamura Chemical Co., Ltd., acrylate monomer) | 64.0 parts |
| Photomer 2017 (trade name, manufactured by EChem Corp., UV diluting agent) | 14.4 parts |
| Solsperse 32000 (trade name, manufactured by Noveon Corp., dispersant) | 0.4 parts |
| (C): Irgalite Blue GLVO (trade name, manufactured by Ciba Specialty Chemicals Corp., pigment) | 3.6 parts |
| Genorad 16 (trade name, manufactured by Rahn Corp., stabilizer) | 0.05 parts |
| (A): Lucirin TPO (trade name, manufactured by BASF Corp., photo-polymerization initiator) | 8.5 parts |
| (A): Benzophenone (photo-polymerization initiator) | 4.0 parts |
| (A): Irgacure 184 (trade name, manufactured by Ciba Specialty Chemicals Corp., photo-polymerization initiator) | 4.0 parts |
| Byk 307 (trade name, manufactured by BYK Chemie, defoaming agent) | 0.05 parts |

The obtained cyan ink composition was printed on a polyvinyl chloride sheet, followed by allowing passing at a speed of 40 m/min under illumination of light from an iron-doped UV-lamp (power 120 W/cm$^2$) to irradiate. A printed material obtained with the ink was evaluated similarly to Example 2-1. Results are shown in Table 2 below.

TABLE 2

| | Exposure Amount (mJ/cm$^2$) | Curability | Adhesiveness n (ASTM) | Flexibility |
| --- | --- | --- | --- | --- |
| Example 2-1 | 330 | Excellent | 4B | 4 |
| Example 2-2 | 330 | Excellent | 3B | 3 |
| Example 2-3 | 330 | Excellent | 3B | 3 |
| Example 2-4 | 330 | Excellent | 3B | 4 |
| Example 2-5 | 330 | Excellent | 3B | 4 |
| Example 2-6 | 330 | Excellent | 4B | 4 |
| Comparative Example 2-1 | 330 | Excellent | 1B | 1 |
| Comparative Example 2-2 | 330 | Sticky | — | — |
| Comparative Example 2-3 | 330 | Poor | — | — |

As is clear from Table 2, the ink compositions according to 2-1 through 2-6 were all cured at high sensitivity, and were excellent in terms of each of curability of an image portion, adhesiveness to a recording medium and flexibility of an image (film).

On the other hand, the ink composition according to Comparative Example 2-1 that does not contain the (D2) component, although exhibiting relatively excellent curability, was inferior in adhesiveness and flexibility to an extent that would cause problems in practical application.

The ink composition according to Comparative Example 2-2 that contains the (D2) component at more than 20 mass % with respect to the total mass of the composition was sticky after curing, and the adhesiveness and the flexibility could not be evaluated.

The ink composition according to Comparative Example 2-3 that contains the (D2) component at less than 3 mass % with respect to the total mass of the composition was insufficient in curability, and the adhesiveness and the flexibility could not be evaluated.

Example 2-7

<Preparation of Support>

An aluminum plate was obtained in the same manner as in Example 1-6. The aluminum plate was cut to a width of 1,030 mm, followed by applying the same surface treatment as in Example 1-6, and thereby an aluminum support was obtained.

(Preparation and Evaluation of Planographic Printing Plate)

On the above-prepared aluminum support, the ink composition of Example 2-6 was printed, and, similarly to Example 2-6, an image was formed and cured.

With this as a planographic printing plate, according to methods below, an image and a printing durability were evaluated.

a. Evaluation of Image

A planographic printing plate prepared with the ink composition of Example 2-6 was mounted on a Heidel KOR-D unit, and ink [VALUES-G Red produced by Dainippon Ink Co. Ltd. for sheet-fed press] and wetting water [Ecolity 2 produced by Fuji Photo Film Co. Ltd.] were supplied to carry out printing. The printed matter after 100 sheets were printed was evaluated by visual observation. As a result, no missing part in the image portion was found and no stain was found in the non-image portion, that is, it was confirmed to be an excellent image.

b. Evaluation of Printing Durability

When the printing was continued as it was, 5,000 sheets or more of high image quality printed matters where no missing part in the image portion and no stain in the non-image portion was found were obtained and the printing durability as well was confirmed to be practically no problem.

As described above, the present invention provides a ink composition which can cure at high sensitivity by irradiation by active radiation, form a high quality image, and obtain sufficient flexibility of image portion formed by curing the ink. Further, the present invention provides a inkjet recording method using the ink composition of the invention.

The present invention also provides a planographic printing plate obtained by using the ink composition which can cure at high sensitivity by irradiation by active radiation such as ultraviolet ray, and a manufacturing method of such planographic printing plate.

All publications, patent applications, and technical standards mentioned in this specification are herein incorporated by reference to the same extent as if each individual publication, patent application, or technical standard was specifically and individually indicated to be incorporated by reference.

What is claimed is:

1. An ink composition comprising:
   (A) a polymerization initiator,
   (B) a polymerizable compound,
   (C) a colorant, and
   (D1) a high molecular compound having a repeating unit represented by the following formula (I):

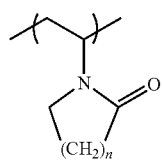

(I)

wherein, in formula (I), n represents an integer of from 1 to 5;
   wherein the viscosity of the ink is within the range of 7 to 30 mPa·s at a temperature of 25 to 50° C. during discharge.

2. The ink composition of claim 1, wherein the content of the high molecular compound having a repeating unit represented by formula (I) is in a range of from 1 to 20 mass % with respect to the total mass of the ink composition.

3. The ink composition of claim 1, wherein the polymerization initiator is a radical polymerization initiator, and the polymerizable compound is a radical polymerizable compound.

4. The ink composition of claim 1, wherein the colorant is either a pigment or an oil-soluble dye.

5. The ink composition of claim 1:
   wherein the surface tension of the ink composition is 20 to 30 mN/m.

6. The ink composition of claim 1:
   wherein (D1) the high molecular weight compound is 2 to 15 mass % with respect to the total mass of the ink composition.

7. The ink composition of claim 1:
   wherein (A) the polymerization initiator is at least one compound selected from the group consisting of an aromatic ketone and an acylphosphine compound.

8. The ink composition of claim 1:
   wherein the ink composition is an ultraviolet ray curable ink composition.

9. The ink composition of claim 1:
   wherein (D1) the high molecular weight compound consists of the repeating units represented by formula (I):

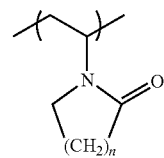

(I)

wherein, in formula (I), n represents an integer of from 1 to 5.

10. An inkjet recording method comprising:
    discharging the ink composition of claim 1 onto a recording medium; and
    irradiating active radiation to the discharged ink composition to cure the ink composition.

11. A method of producing a planographic printing plate comprising:
    discharging the ink composition of claim 1 onto a hydrophilic support; and
    irradiating active radiation on the discharged ink composition to cure the ink composition and form a hydrophobic image that is formed by curing the ink composition on the hydrophilic support.

12. A planographic printing plate that is produced according to the method of producing a planographic printing plate of claim 11.

* * * * *